United States Patent [19]

Angell, Jr. et al.

[11] 3,988,403

[45] Oct. 26, 1976

[54] PROCESS FOR PRODUCING MOLDED STRUCTURAL FOAM ARTICLE HAVING A SURFACE THAT REPRODUCIBLY AND FAITHFULLY REPLICATES THE SURFACE OF THE MOLD

[75] Inventors: Richard G. Angell, Jr., Somerville; Robert J. Anderson, Whitehouse Station; Kenneth E. Hobbs, Helmetta, all of N.J.; David E. James, Elkview, W. Va.; B. Duane Marsh, Somerville, N.J.

[73] Assignee: Union Carbide Corporation, New York, N.Y.

[22] Filed: May 22, 1975

[21] Appl. No.: 580,017

Related U.S. Application Data

[63] Continuation-in-part of Ser. No. 486,752, July 9, 1974, abandoned.

[52] U.S. Cl. ............................ 264/45.5; 264/50; 264/53; 264/40.7; 264/54; 264/328; 264/DIG. 5; 264/DIG. 14; 264/DIG. 83; 428/320; 428/409
[51] Int. Cl.² .................... B29D 27/00; B29F 1/06
[58] Field of Search ........ 264/50, DIG. 83, DIG. 14, 264/45.5, 328, DIG. 5, 40; 428/320, 409

[56] References Cited
UNITED STATES PATENTS

| | | | |
|---|---|---|---|
| 2,928,130 | 3/1960 | Gray | 264/50 |
| 3,162,703 | 12/1964 | Eyles | 264/DIG. 83 |
| 3,268,636 | 8/1966 | Angell | 264/DIG. 83 |
| 3,382,535 | 5/1968 | Ferrari | 264/DIG. 8 |
| 3,436,446 | 4/1969 | Angell | 264/DIG. 83 |
| 3,531,553 | 9/1970 | Bodkins | 264/DIG. 83 |
| 3,544,518 | 12/1970 | Bodkins et al. | 264/DIG. 14 |
| 3,671,168 | 6/1972 | Nussbaum | 264/DIG. 83 |
| 3,734,449 | 5/1973 | Itou et al. | 264/DIG. 14 |
| 3,773,873 | 11/1973 | Spaak et al. | 264/DIG. 14 |
| 3,776,989 | 12/1973 | Annis et al. | 264/DIG. 83 |

OTHER PUBLICATIONS

Martino, Robert J., "Structural Foams, Its Looking More Solid Every Day," in Modern Plastics, Mar. 1974, pp. 38–41.
Martino, Robert J., "New Blowing Agents for the New Era in Foam," in Modern Plastics, Mar. 1974, pp. 42–45.
Ballman, R. L.; R. L. Kruse and W. P. Taggert, "Surface Fracture in Injection Molding of Filled Polymers," in Polymer Engineering and Science, May 1970, vol. 10, No. 3, pp. 154–158.
Fritch, Leroy W., "Is There a Cure for Splay?" in Plastics Engineering, Apr. 1975, pp. 61–64.
McKelvey, James M., "Polymer Processing," New York, Joan Wiley and Sons, c1962, pp. 100–104.
Brydson, J. A., "Flow Properties of Polymer Melts," New York, Van Nostrand Reinhold, c1970, pp. 21–37, 63–78, 159–166, 180–183.
Cogswell, F. N. and P. Lamb, "Polymer Properties Relevant in Melt Processing," in Plastics and Polymers, Oct. 1970, pp. 331–342.
Tordella, J. P., "Fracture in the Extrusion of Amorphous Polymers Through Capillaries," in Journal of Applied Physics, vol. 27, No. 5, May 1956, pp. 454–458.
Schulken, R. M. and R. E. Boy, "Cause of Melt Fracture," In SPE Journal, Apr. 1960, pp. 423–428.
Brydson, J. A., "Plastic Materials," Princeton, N. J., D. Van Nostrand, c1966, pp. 33–43.
Meyer, Louis W., "Injection Molding of Expandable Polystyrene," in SPE Journal, Nov. 1962, pp. 1399–1403.
Czerski, J., "Injection–Moulded Foams," in Plastics and Polymers, Dec. 1971, pp. 406–411.
Tordella, J. P., "Melt–Fracture–Extrudate Roughness in Plastics Extrusion," in SPE Journal, Feb. 1956, pp. 36–40.
Pearson, J. R. A., "Mechanical Principles of Polymer Melt Processing," New York, Pergamon Press, c1966, pp. 48–66, 128–134.

*Primary Examiner*—Philip Anderson
*Attorney, Agent, or Firm*—Charles J. Metz

[57] ABSTRACT

A process is disclosed for producing a structural foam article having a surface that reproducibly and faithfully replicates the surface of the mold within which the article was made. The process is an improvement in the "low pressure" process for producing structural foam, wherein the improvement resides in introducing the molten mixture of foamable thermoplastic material and blowing agent into the mold under such conditions that a no-slip boundary condition is maintained at an interface between the flowing thermoplastic and a predetermined portion of the interior surface of the mold, and by maintaining the temperature at said interface at or above a certain temperature (termed "replication temperature"), while the thermoplastic is flowing in the mold.

18 Claims, 39 Drawing Figures

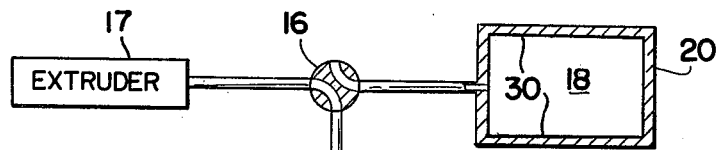
FIG. 1
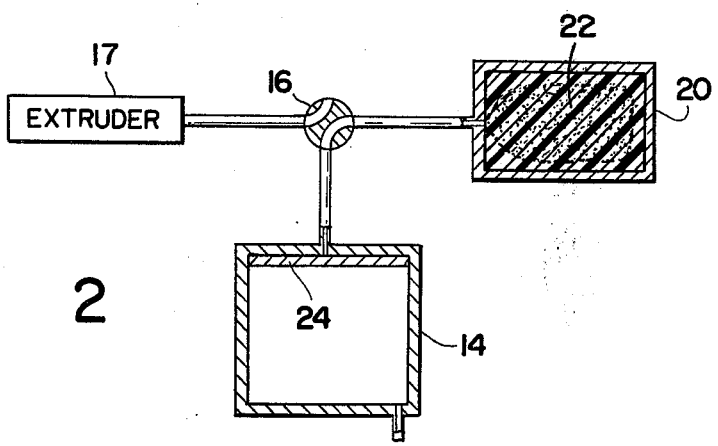
FIG. 2
FIG. 3
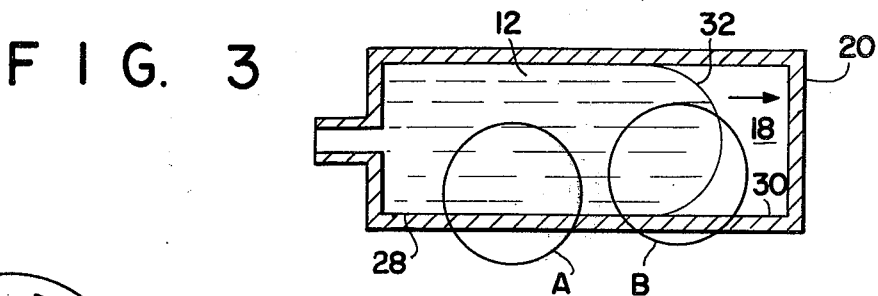
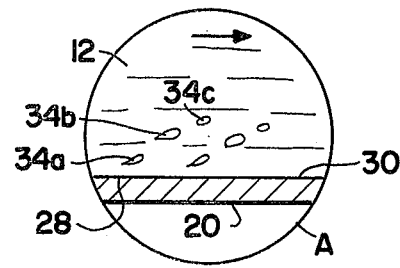
FIG. 4

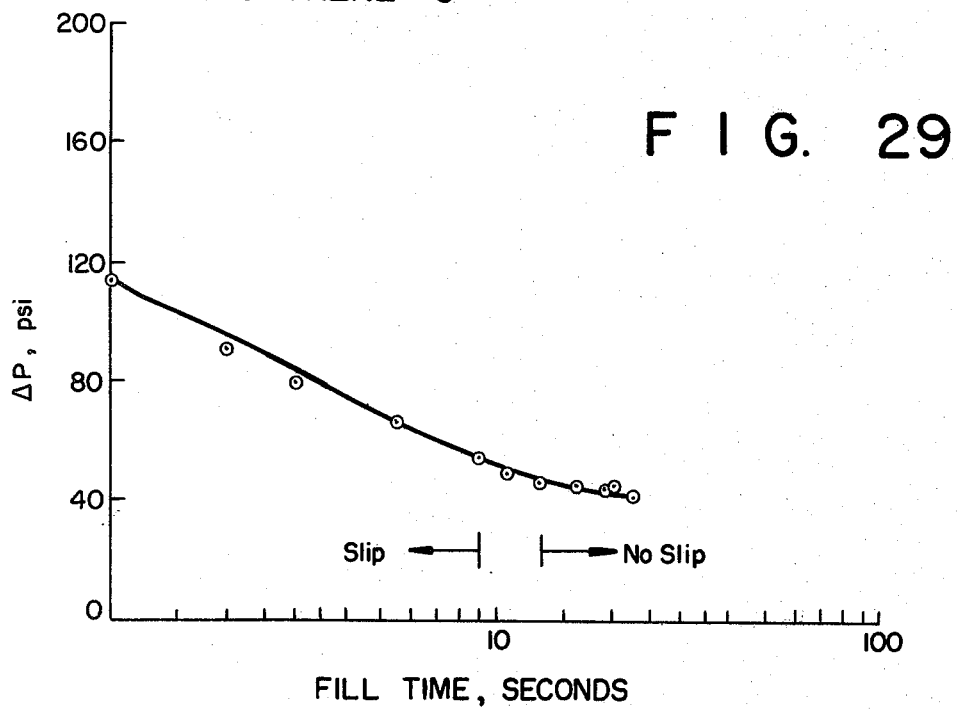
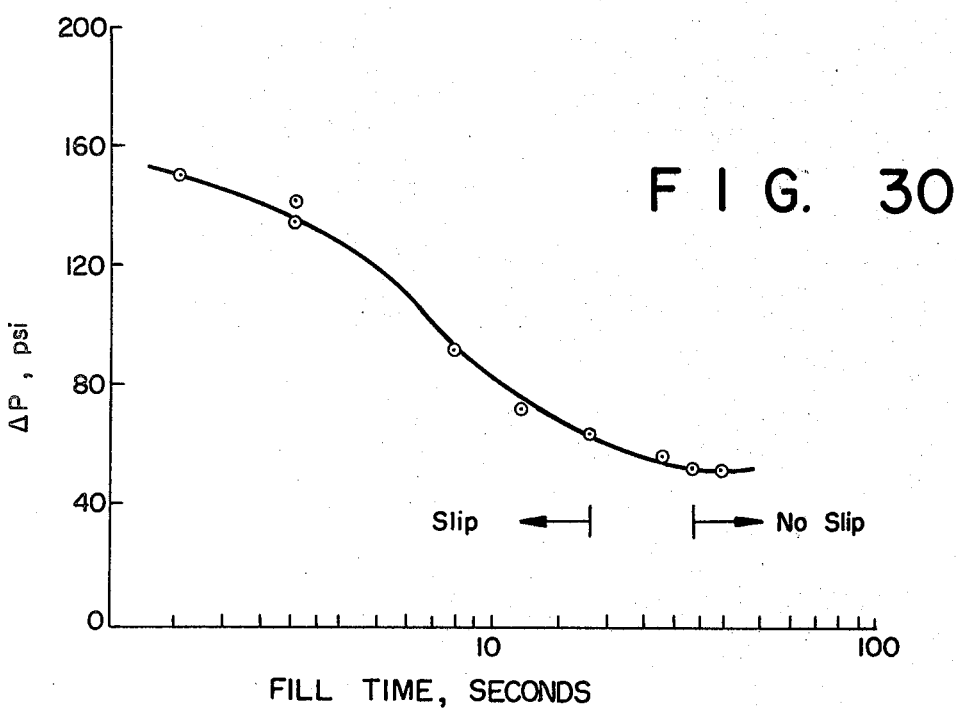

PROCESS FOR PRODUCING MOLDED STRUCTURAL FOAM ARTICLE HAVING A SURFACE THAT REPRODUCIBLY AND FAITHFULLY REPLICATES THE SURFACE OF THE MOLD

This application is a continuation-in-part of our co-pending application Ser. No. 486,752, filed July 9, 1974 and now abandoned.

The invention relates to the molding of a foamed thermoplastic article having a surface that reproducibly and faithfully replicates the surface of the mold in which it was made.

The present invention provides an important and mush-desired improvement in the low pressure process for the production of foamed thermoplastic articles having a foamed core and a relatively non-foamed exterior shell. Such articles are known as "structural foam." The low pressure process for producing structural foam includes the step of introducing a molten mixture of a foamable thermoplastic polymer and a blowing agent into a mold cavity of a fixed geometry that is maintained at a pressure below the foaming pressure of the mixture while the mixture is filling the mold. As a result, foaming occurs in the mold cavity. The characteristic feature of the low pressure process is the maintenance in the mold cavity of a pressure below the foaming pressure of the mixture. This pressure is usually, but not necessarily, atmospheric.

In the March 1974 issue of "Modern Plastics," on pages 38–45 there is an article on structural foam that mentions a problem, the solution of which has heretofore eluded the practitioners of the low pressure structural foam process. That problem is the inability, on a commerical basis, to produce a structural foam article having a surface that reproducibly and faithfully replicates the inner surface of the mold cavity within which the article was made. While this problem is usually talked about in terms of producing a smooth, glossy article, it is a problem with any type of surface — e.g., a matte finish, a surface design, simulated leather surface, as well as a smooth and glossy surface. As the said "Modern Plastics" article intimates, a process for the commercial production of structural foam articles having surfaces that reproducibly and faithfully replicate the mold surface is much sought after in the plastics industry today.

It is an object of the invention to provide a method for the production of foamed thermoplastic articles having surfaces that reproducibly and faithfully replicate the surface of the mold in which said articles are produced.

It is another object of the invention to provide a method for the production of foamed thermoplastic articles having reproducibly smooth, glossy surfaces.

These and other objects will be apparent from the following detailed description, the appended claims, and the several views illustrated in the accompanying drawings.

The present invention provides a method for producing structural foam articles whose surfaces reproducibly and faithfully replicate the surface of the mold in which they are produced. The process of the invention comprises introducing a molten mixture of a foamable thermoplastic material and a blowing agent into a mold cavity described by the inner surface of a mold, the mold cavity being at a pressure below the foaming pressure of said molten mixture, whereby said molten mixture flows and expands in said mold cavity, and rigidifying said thermoplastic material while it is in said mold cavity, wherein, as the molten mixture flows in the mold cavity, a no-slip boundary condition is maintained at the interface between the thermoplastic material and the inner surface of the mold, and the temperature at the interface between the flowing thermoplastic material and the inner surface of the mold, is maintained at or above the replication temperature.

IN THE DRAWINGS

FIG. 1 is a cross-sectional, partially schematic view of one stage of operation of an apparatus adapted to carry out the invention;

FIG. 2 is a cross-sectional, partially schematic view of a later stage of operation of the same apparatus;

FIG. 3 is an enlarged cross-sectional view of a molten, thermoplastic foamable mixture while it is flowing in a mold cavity in accordance with the invention;

FIG. 4 is an enlarged cross-sectional view of individual bubbles in a molten, thermoplastic foamable mixture while the mixture is flowing in a mold cavity in accordance with the invention, the view being taken from the area indicated as A in FIG. 3;

FIGS. 27 through 32 are graphs of pressure drop versus fill times, for the same six thermoplastic polymers;

Figure 5:
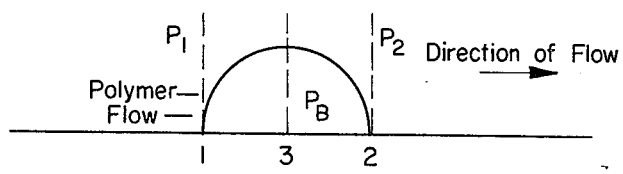
FIGS. 5 through 8 are sequential enlarged cross-sectional views of a bubble at the thermoplastic material/mold interface, and being moved by forces that are fully explained below from the interface into the flowing thermoplastic material.

The following definitions apply to this invention:

Structural foam — the broad expression used to describe articles made from thermoplastic material and having a foamed or cellular core with a relatively (compared to the core) non-foamed exterior shell;

Mixture of molten foamable thermoplastic material and a blowing agent — a mixture of a molten thermoplastic containing a blowing agent such as a dissolved gas (for instance, nitrogen, carbon dioxide, a fluorocarbon, or other inert gas) or a chemical blowing agent, said mixture being capable of foaming when the pressure on the mixture is reduced below the foaming pressure and the temperature of the mixture is above the foaming temperature;

Foaming pressure — the external pressure on the foamable mixture at or below which, given a particular temperature, an internally contained or dissolved blowing agent can expand as a gas, thereby to produce the substantial foaming expansion of the thermoplastic material within which it is contained;

Foaming temperature — the temperature of the foamable mixture at or above which internally contained or dissolved blowing agent can expand as a gas, thereby to produce the substantial foaming expansion of the thermoplastic material within which it is contained when the mixture is at or below the foaming pressure for that particular temperature;

Reproducibly and faithfully replicate a predetermined portion of the inner surface of the mold cavity — this refers to a structural foam article that has a surface that substantially duplicates the desired (predetermined) portion of the inner surface of the mold cavity. The term "replicate" is employed to reflect the fact that the surface of the structural foam article is a mirror image of the mold surface. The term "reproducibly" reflects the fact that there is a high degree of reproducibility of the desired results from one article to the next. The term "faithfully" is employed in the sense that it is used in the printing art, that is, to reflect the fact that the surface of the structural foam article can be a clear duplicate (albeit the mirror image) of the inner surface of the mold cavity. Included within the concept of faithful replication are the facts: that the invention provides means for insuring that the surface be free of skid marks or other surface defects that result from the thermoplastic material sliding along the surface of the mold and/or from melt fracture of the thermoplastic material as it flows in the mold; and, in addition, that the invention also provides means for insuring that the surface be free of pock marks, blisters, scales, streaks, and other bubble-caused defects, none of which defects are characteristic or reflective of the inner surface of the mold;

Substantial foaming expansion — by this term it is meant that there is a significant degree of expansion over the fully dense, or non-foamed, thermoplastic material. For instance, a 5 to 10 percent or more expansion over the fully dense material would be considered to be "substantial foaming expansion;"

No-slip boundary condition — this term will be more fully discussed below, but briefly, it means that the thermoplastic material immediately adjacent to the inner surface of the mold neither slips or slides along the surface nor does it fracture, as the thermoplastic material flows in the mold cavity;

Rigidifying the thermoplastic material — this refers to solidifying the molten thermoplastic material enough so that it retains ites structure when it is removed from the mold cavity, as by cooling the thermoplastic material after it has expanded;

Bubbles that form as said thermoplastic material foams in the mold cavity migrate from the interface — this refers to that aspect of the invention wherein the bubbles that are present at or near the interface between the thermoplastic material and the inner surface of the mold are caused to move away from the said interface far enough so that the surface of the structural foam article is free of bubble-caused defects (e.g., pin holes, streaks, blisters, and pock marks). By "near" the interface is meant, for example, a distance of from about 5 to 10 mils, depending on conditions. High pressure in the bubble would require a thicker skin to prevent blisters than low pressure in the bubble;

Leading edge of flow — this refers to the front edge of the flowing thermoplastic material, as is illustrated in FIG. 3 by reference numeral 32; and Replication Temperature — that temperature at the interface between the flowing thermoplastic material and the inner surface of the mold, at which the "leading edge problem" (described fully below) is overcome. The Examples set forth a procedure for determining, with considerable precision, the replication temperature for any given themoplastic polymer formulation, mold construction, and set of molding conditions.

Referring now to the drawings, a typical operation of the invention is illustrated in the several figures. in FIG. 1, a charge of a mixture 12 of a molten foamable thermoplastic material and a blowing agent is introduced into an accumulator 14 through a valve 16 from a means such as an extruder 17 for mixing molten thermoplastic material and the foaming agent, to form said mixture 12. In the accumulator 14, the mixture 12 is maintained at a temperature above the foaming temperature of the mixture 12 and at a pressure above the foaming pressure of the mixture 12. This pressure in the accumulator 14 is maintained by conventional means, as by fluid pressure acting on a piston 24, said pressure being provided by a conventional source (not shown). When the desired quantity of mixture 12 has been charged to the accumulator 14, the valve 16 is turned from the position shown in FIG. 1 to the position shown in FIG. 2. (As a general rule, the unfoamed volume of mixture 12 introduced into the mold cavity 18 will be less than the volume of the mold cavity 18.) The mixture 12 then flows from the accumulator 14 through the valve 16 into the cavity 18 of a mold 20, said cavity 18 being defined by the inner surface 30 of the mold 20. The mold cavity 18 is maintained (by conventional means, not shown) at a pressure not greater than the foaming pressure of said mixture 12. (There may be zones, especially adjacent to the nozzle or injection port, in which the pressure may temporarily rise above the foaming pressure.) While in the cavity 18, the mixture 12 expands to fill the cavity 18 and conforms to the overall shape of the cavity 18, to form, when solidified, a structural foam article 22 having the overall shape of the mold cavity 18.

Thus far, the immediately foregoing description of the process of the invention has set forth those features of the overall inventive process that can be the same as the conventional low pressure processes for the production of structural foam. One such low pressure process, and several types of apparatus that can be employed to practice the same, are described in Angell, U.S. Pat. Nos. 3,268,636 and 3,436,446, the disclosures of which are incorporated herein by reference. The improvement over the broad low pressure process resides in the provision of means for producing a structural foam article whose surface reproducibly and faithfully replicates, to a controlled degree, the inner surface of the mold in which it was produced.

We have found that imperfect replication of the inner surface of the mold cavity in structural foam production can result from one or more separately identifiable causes. The first is sliding or slipping of the plastic over the surface of the mold as the molten mixture flows within the mold cavity. This is the direct cause of swirls, skid marks, and similar surface defects, and in some cases may also cause melt fracture of the plastic. Slipping or sliding of the plastic over the surface of the mold is the indirect cause of certain bubble-related defects such as pock marks and pin holes that result from the failure of bubbles to migrate away from the surface. The defects that are caused, both directly and indirectly, by this slipping and sliding are eliminated by maintaining a no-slip boundary condition at the interface between the flowing thermoplastic material and the inner surface of the mold. The swirls, skid marks and the like are thereby eliminated, and the conditions are created which cause the bubbles to migrate away from the surface that is adjacent to the said interface.

A second major cause of surface defects is the following: When the no-slip boundary condition exists, the surface of the flowing plastic, including the surface at the leading edge of the flowing plastic as well as the surface adjacent to the inner surface of the mold, may be compared to the endless moving tread of a tank. These leading edge imperfections that form when bubbles break through the surface at the leading edge are transferred to the surface of the flowing plastic that is adjacent to the inner surface of the mold, as the said leading edge surface becomes in turn the said adjacent surface. These surface defects usually appear as streaks, sometimes in the form of elongated ellipses that look as though the outline of the original bursting bubble had been stretched out. This type of defect is eliminated by maintaining the interface between the flowing plastic and the inner surface of the mold at or above the replication temperature, to thereby permit the said defects to be healed. It is possible that this leading edge problem exists even when the no slip boundary condition is not maintained. In such a case, however, the swirls, skid marks, etc., would tend to overwhelm the leading edge defects so that they would not be noticed.

The no-slip boundary condition, and the healing of the "leading edge defects," are discussed in detail below.

We have found that the no-slip boundary condition is achieved by introducing the thermoplastic material into the mold cavity, under such conditions that, while the mixture is flowing in the mold, the force resulting from the shearing stress at or near the polymer/mold interface does not exceed the static frictional force resulting from the coefficient of friction between the mold and the molten polymer, and, in addition, the force in the polymer resulting from the shearing stress does not exceed the melt strength of the molten polymer flowing in the mold. On the one hand, if the static frictional force is exceeded, the thermoplastic material will slide along the mold surface which will cause skid marks on the polymer. These skid marks can lead to swirls or other surface imperfections being formed on the surface of the structural foam article. On the other hand, if the force resulting from the shear stress exceeds the polymer melt strength, the polymer will undergo melt fracture. Since the shear stresses are largest near the polymer/mold boundary, the fracture, if it occurs, will exist on or very near the boundary. The polymer melt fracture would also result in swirls and other surface imperfections on the surface of the structural foam article. In most cases wherein the desired no-slip boundary condition is not maintained, it is probable that sliding rather than melt fracture results. However, theoretically, either or both can be present in any given case.

The desired "no-slip" boundary condition can be obtained by controlling the forces resulting from shearing stresses so as to maintain them (1) below the maximum value of the force of static friction, $F_s$, acting on the boundary, and (2) below the melt strength of the flowing thermoplastic material. (The maximum value of the force resulting from static friction equals the coefficient of friction multiplied by the normal force.) Reducing the shearing stresses, and increasing both the frictional forces ($F_s$) and the melt strength of the resin, will aid in maintaining the no-slip boundary condition. The shearing stresses are small in the center of the flow, and increase to a maximum near the mold surface. Thus, the stresses near the mold boundary are the most important. These stresses depend on the viscosity of the plastic material, the geometry of the mold, the injection time, and the number of and position of the injection ports. An approximate relationship for the shearing stress near the mold boundary in a rectangular slab with evenly spaced injection ports can be represented by the equation:

Shearing Stress: Melt Viscosity × Shearing Rate or

Shearing Stress: $\frac{\text{Melt Viscosity} \times \text{Length of Mold}}{\text{Injection Time} \times \text{Number of Injection Ports} \times \text{Part Thickness}}$ In view of this relationship, several methods for reducing the shearing stress in the flowing polymer can be stated: reducing the viscosity, reducing the length of the mold, increasing the mold thickness, increasing the injection time, or increasing the number of injection ports all cause a reduction in the shearing stress. All of these methods, except for reducing the viscosity, act to decrease the rate of shear in the flowing plastic. The viscosity near the mold boundary can be reduced by raising the injected plastic temperature or the mold surface temperature. The viscosity can also be reduced by lowering the polymer molecular weight or by adding small amounts of solvents for the polymer or other plasticizing additives to the formulation used in the process. Increasing the amount of blowing agent gas will act to plasticize the plastic in many cases.

The maximum value of the static frictional force, $F_s$, depends on the coefficient of static friction and the normal force applied to the polymer at the mold-/polymer boundary. The normal force in this case is supplied by the isotropic pressure in the flowing melt. This force can be increased by operating the mold with a back pressure, thus operating at higher pressures. The maximum value of the frictional force, $F_s$, can also be increased by increasing the static coefficient of friction. This can be achieved by increasing the mold temperature, by modifying the surface of the mold, or by introducing additives to the plastic formulation.

The melt strength of the formulation can be increased by increasing the polymer molecular weight or broadening the molecular weight distribution through the inclusion of a high molecular weight tail. It can also be increased by reducing the temperature of the polymer or by including additives in the formulation to increase the strength. Well known additives for this purpose include fibrous fillers such as glass fibers.

The above discussion points to several variables which can be correlated in order to maintain the no-slip boundary condition. In a given mold, reducing the shear rate by increasing the number of injection ports and/or increasing the injection time will result in reduced shearing forces in the flowing plastic. They leave the maximum value of the force of static friction, $F_s$, and the melt strength relatively unaffected.

The polymer viscosity can be reduced by increasing the mold temperature, increasing the injected plastic temperature, or through the inclusion of polymer solvents or other plasticizing additives. All of these then result in a reduction of the shearing stress. They also act to increase the coefficient of friction, thereby increasing the maximum value of the force of static friction, $F_s$, which acts on the mold/polymer boundary. Both changes aid to maintain the no-slip boundary condition. Based on a given formulation, mold geometry, and mold and melt temperature, there will be a certain injection rate (of the molten foamable mixturre into the mold cavity) at which the shearing stress equals the maximum value of the force of static friction, $F_s$. At these conditions, a slight increase in shearing force (as would be caused by increasing the injection rate) will cause the polymer to begin to slip in the mold. This injection rate will change as other parameters which influence the shearing stresses or frictional forces change. For instance, the requisite injection rate would increase as the number of injection ports is increased, the mold thickness is increased, or as the viscosity of the molten polymer is reduced by the use of plasticizing additives or by increasing the melt temperature. Specific illustrations of the application of this principle are presented in the Examples below.

When the no-slip boundary condition is maintained as the mixture flows in the mold cavity, bubbles that are within the polymer but near the polymer/mold interface will migrate away from that interface. In FIG. 3, a charge of molten foamable mixture 12 is shown being introduced into a mold cavity 18. Because a non-slip boundary condition is maintained at the interface 28 between the molten foamable mixture 12 and the inner surface 30 of the mold 20, that portion of the molten foamable mixture 12 that comes into contact with the inner mold surface 30 is stationary, and does not move in the direction of flow, which is indicated by the arrows in FIGS. 3 and 4. For this reason, the center of the flowing mixture 12 moves at a higher velocity than the portions of the flowing mixture 12 closer to the edges. This is shown in idealized and, perhaps, exaggerated form in FIG. 3, wherein the leading edge 32 of the flowing mixture 12 assumes a curved, convex configuration.

A significant result of the velocity gradient from the edges to the center of the flowing mixture 12 is illustrated in FIG. 4. As the molten foamable mixture 12 enters the mold cavity 18, the mixture 12 begins to foam because, at least some distance from the injection port if not directly under it, the cavity 18 is maintained at a pressure not greater than the foaming pressure of the mixture 12. Bubbles begin to form throughout the mixture 12. Because of the aforementioned velocity gradient, the bubbles that form at or near the edge of the flowing mixture 12 tend to move toward the center of the mixture 12. This is shown in exaggerated form in FIG. 4, wherein a bubble (shown sequentially as 34a, 34b, and 34c) is seen to migrate toward the center of the flowing mixture 12 as the mixture 12 flows into and fills the mold cavity 18.

There are at least two mechanisms that contribute to this migration of the gas bubbles within the mixture toward the center of the flowing stream. The first mechanism is an inertial effect of the fluid flowing around the dispersed gas bubbles. It is an effect similar to the well known aerodynamic principle that causes lift forces on an airfoil. Consider a bubble near the lower mold/polymer boundary. The bubble will move at a velocity equivalent to the velocity of the polymer along the bubble's center of mass. The polymer below the gas bubble equator is moving at a lower velocity than the bubble and the polymer above the bubble equator is moving at a higher velocity than the bubble. Thus, to an observer located in the center of the bubble, the polymer above the equator is moving forward and that below the equator is moving backward toward the injection source. Near a boundary, the fluid flowing relative to the bubble and on the side of the boundary is constrained. The constraint acts as a driving force for migration of the bubble toward the center of the flow stream. The magnitude of the force can be quite large as the bubble approaches the mold wall. The force decreases as the distance from the bubble to the wall increases. Experimental observations of the migration of fluids and solids dispersed in other fluids have been reported in the technical literature. Recently theoretical analyses have also been able to predict the migration of spherical solids and deformable droplets dispersed in viscous liquids.

The second mechanism which can contribute to bubble migration away from solid boundaries towards the center of the flow stream involves polymer melt elasticity. The flowing mixture 12 is a visco-elastic fluid. The effects of melt elasticity on the forces acting on dispersed bubbles can best be visualized by reference to the example given earlier in the discussion of inertial forces. The bubble moves at a velocity equivalent to the polymer velocity along the streamline through the bubble's center of mass. The fluid on each side of the bubble equator has motion relative to the bubble. Consider a bubble located near the lower mold surface. A polymer fluid element which lies directly in front of the bubble and below the bubble equator must stretch out to pass between the bubble and the mold boundary. In a visco-elastic fluid, this elongation gives rise to a tensile force in the fluid element. Similar tensile forces are set up in the fluid elements flowing over the upper surface of the bubble. However, because these fluid elements are not constrained by the mold boundary they need not elongate as much. Thus, the tensile forces acting on the upper surface of the bubble are lower than those acting on the lower surface. This inequality of forces leads to a net force which acts to move the bubble towards the center of the mold. These elastic tensile forces can be quite large near a boundary and diminish as the distance of the bubble from the boundary increases.

While both of the above-discussed forces (i.e., the inertial force and the force involving melt elasticity) are small, each is significant, and they reinforce each other. The net result is a definite migration of the bubbles away from the edge of the plastic. Cutaway samples of articles produced in accordance with the invention show tear drop-shaped bubbles with the larger end of the bubbles slanted both away from the edge toward the center and in the direction of flow, as is shown in FIG. 4. This experimental evidence is consistent with the theories advanced above concerning the two forces acting upon the bubbles.

The above mechanisms require that the dispersed bubbles be totally immersed in the flowing continuous phase and not in contact with the mold surface. As long as the "no-slip" condition is maintained, the bubbles that form within the flowing polymer and near the polymer/mold interface will migrate away from that interface. However, it is thought that more than the no-slip boundary condition is required to force bubbles that form at the polymer surface away from that surface and into the polymer. To achieve this desired result, there apparently must be a certain minimum amount of adhesion between the molten polymer and the inner surface of the mold, as is explained below.

Figure 6:
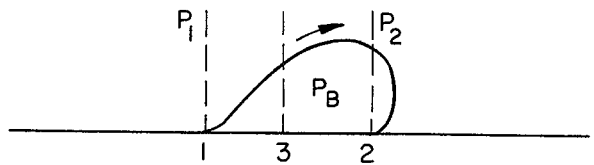

The mechanism for the movement of bubbles away from direct contact with the mold surface is thought to result from the pressure drop experienced by the flowing polymer and the momentum of the flowing polymer just upstream of the bubble. FIG. 5 shows a hypothetical bubble which resides on the mold surface. The velocity gradient in the continuous phase is such that there is no flow at the boundary surface and the velocity increases as the distance from the surface increases. The upstream polymer which is obstructed by the bubble must either deform the bubble or flow around the bubble. The forces acting to restrain deformation of the bubble are the interfacial tension and the internal bubble pressure. These are not sufficient to overcome the momentum of the polymer just upstream of the bubble. Thus the bubble goes through the deformations illustrated in FIGS. 6 through 8. One can also consider the pressures and pressure gradients which exist in the localized region of the bubble. The polymer flow results from a pressure gradient. Thus, the pressure $P_1$ is larger than the pressure $P_2$. The pressure internal in the bubble, $P_B$, is nearly constant at the average value of $P_1$ and $P_2$. Station 3 in FIG. 5 is located at the bubble center before deformation begins. Between stations 1 and 3 in FIG. 5, there is then a pressure gradient across the bubble interface $P_1$-$P_B$. The pressure $P_1$ being slightly larger than $P_B$ causes the polymer to flow towards the mold surface. In the region between stations 3 and 2, the pressure $P_B$ is larger than $P_2$ which results in the bubble flowing slightly away from the mold surface. The result of these coupled flows, driven by the localized pressure gradients, is that the bubble is forced away from contact with the mold surface.

In order for the above-described mechanism to operate, however, it is necessary that the polymer have sufficient adhesion to the mold surface to prevent the gas in the bubble from escaping near the leading edge of the bubble between the polymer and mold surface. Consider FIG. 5 - again the pressure in the bubble is $P_B$ and the pressure at Station 2, the leading edge of the bubble, is $P_2$. $P_2$ is slightly lower than $P_B$. The pressure gradient acting along this leading edge of the bubble will tend to force the polymer off the mold surface. This would allow the gas in the bubble to form a surface defect oriented in the direction of flow if the adhesion were insufficient. However, if the polymer/mold adhesion is sufficiently high to resist this pressure force, the polymer will remain in contact with the mold and the bubble will be forced off the mold surface and into the flowing polymer by the mechanism discussed above.

The foregoing discussion concerning adhesion is our best explanation of the mechanism by which individual bubbles are moved off the surface and into the flowing plastic. We have encountered very few cases (a) wherein the no-slip boundary condition was maintained, and (b) wherein the temperature at the interface was at or above the replication temperature, in which a few surface defects might have been caused by insufficient adhesion, as described above. And in those few cases, the defects may have been the result of other causes. Therefore, we can state, with nearly 100 percent confidence, that when the no-slip boundary condition is maintained, and when the temperature at the interface is maintained at or above the replication temperature, the requisite adhesion described above will also be obtained.

Figure 9:
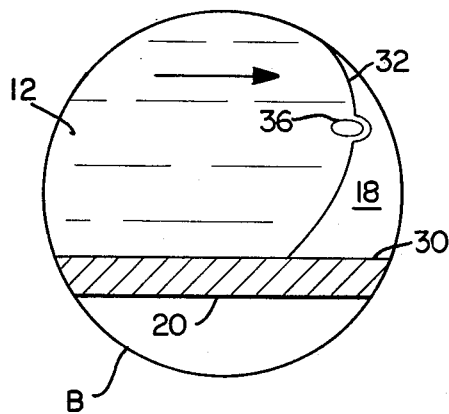
FIGS. 9 through 14 are sequential enlarged cross-sectional views of a bubble causing a surface imperfection at the leading edge of the flowing thermoplastic, which imperfection is then transferred to the surface adjacent to the interface between the flowing plastic and the inner surface of the mold, with the views being taken from the area designated as B in FIG. 3.
Figure 10:
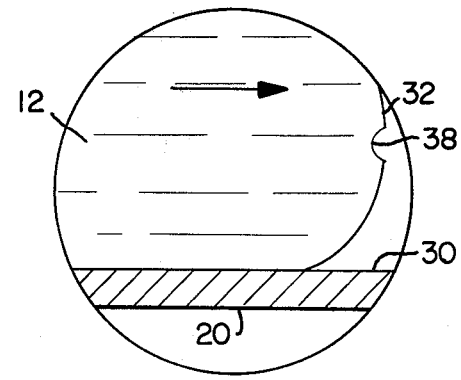
Figure 11:
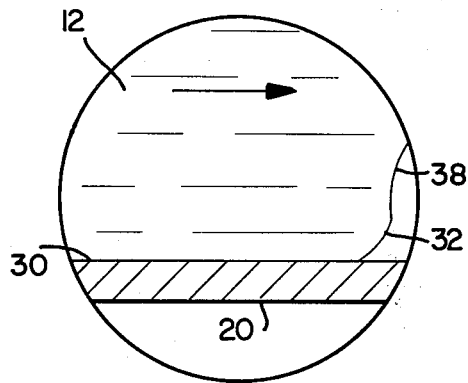
Figure 12:
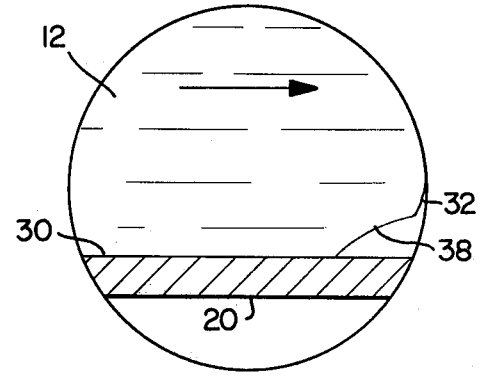
Figure 13:
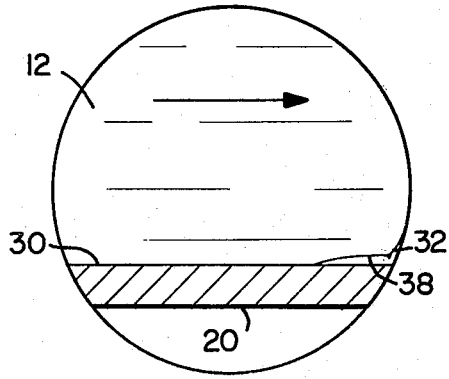
Figure 14:
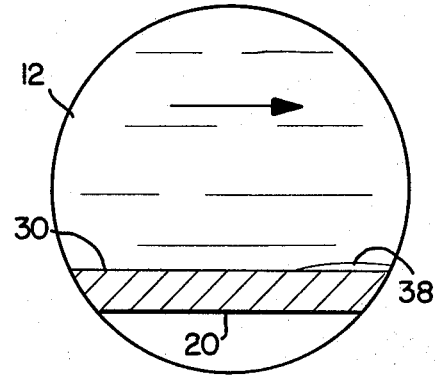
Figure 15:
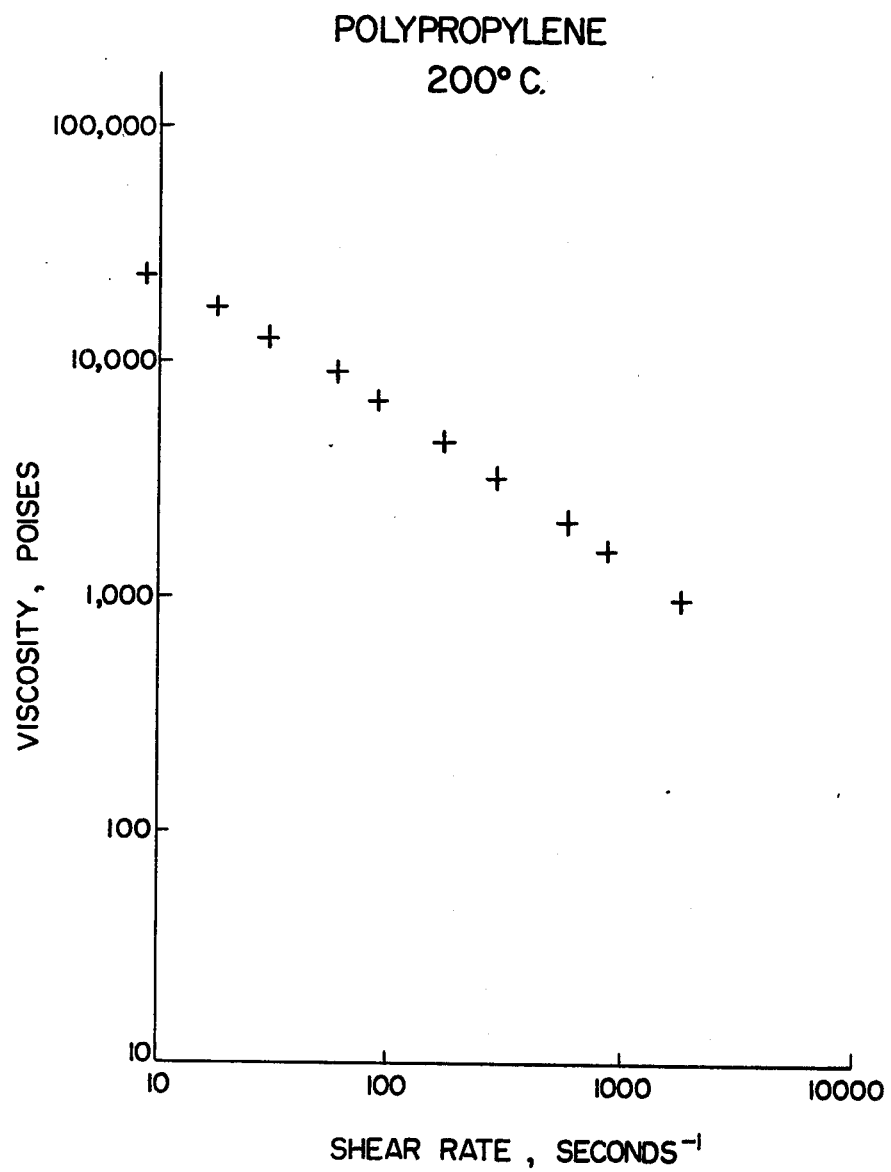
FIGS. 15 through 20 are graphs of viscosity versus shear rate at 200° C. for six different thermoplastic polymers.
Figure 16:
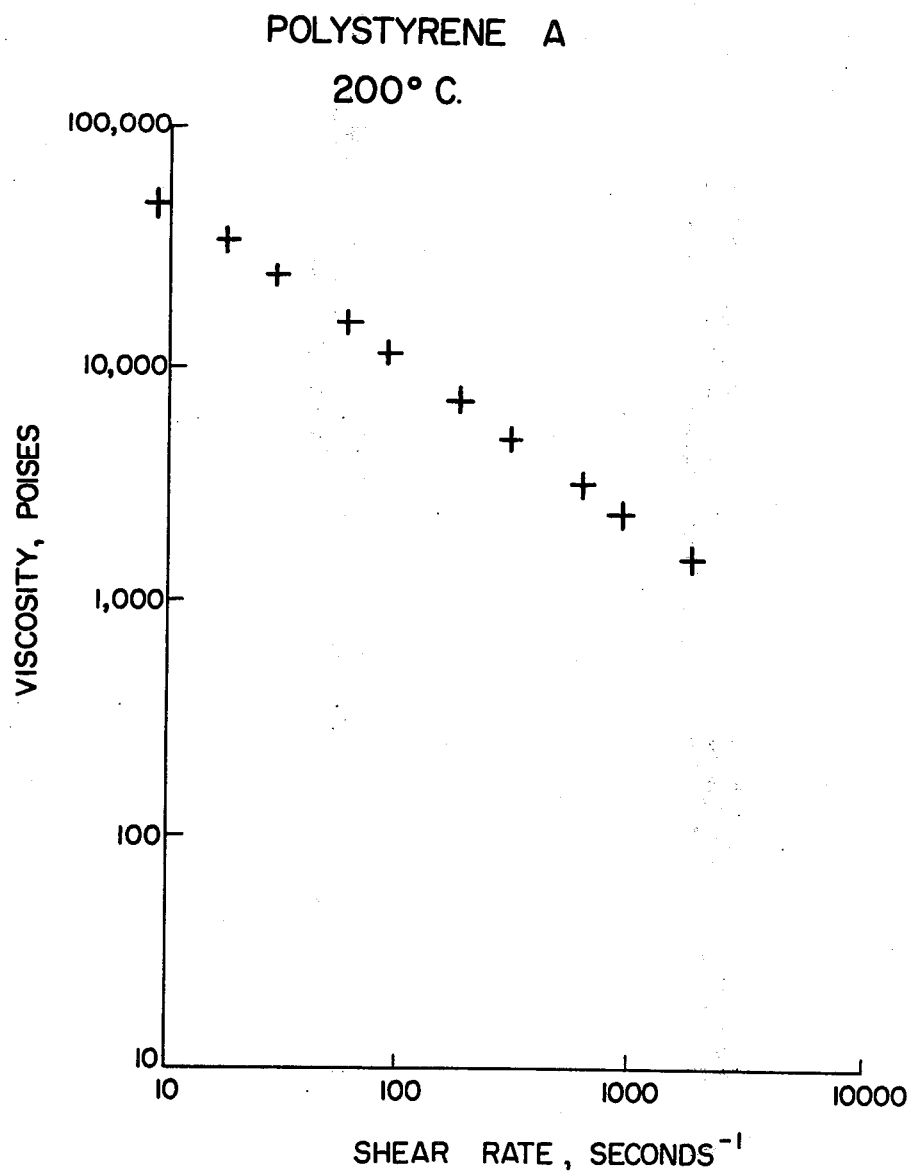
Figure 17:
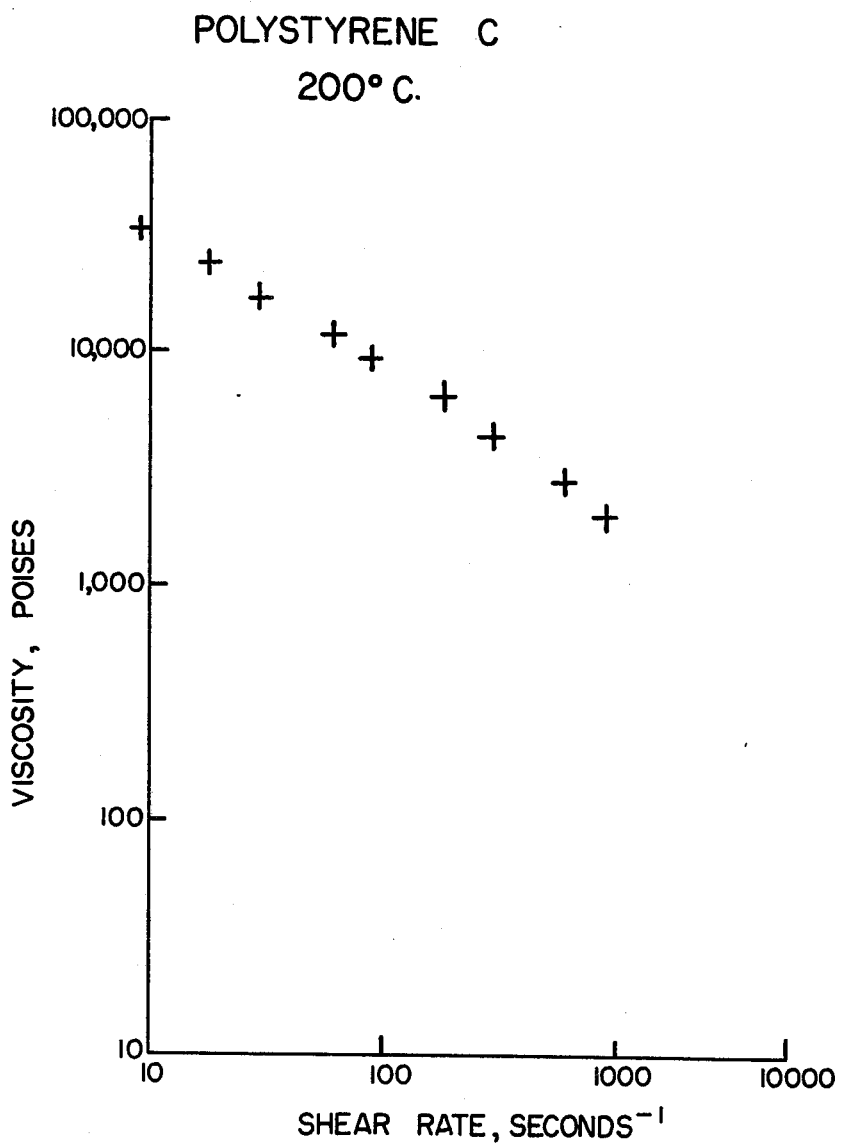
Figure 18:
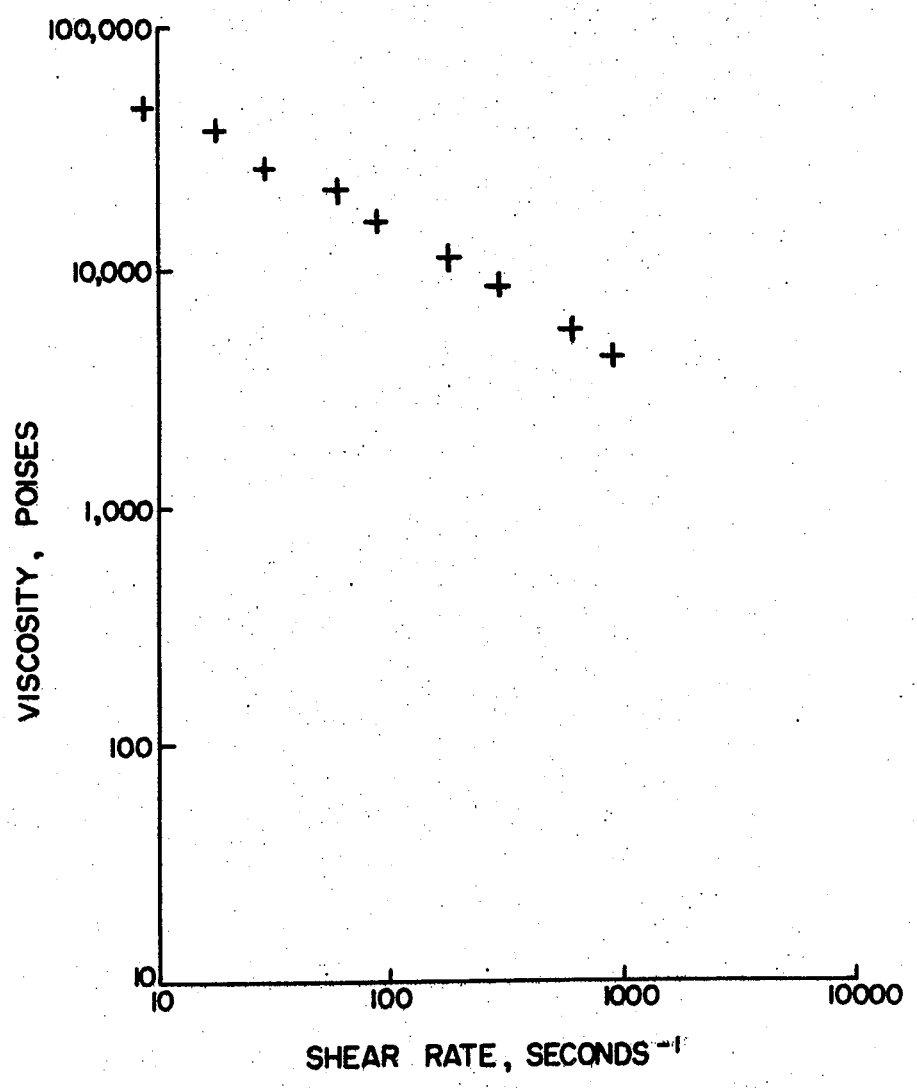
Figure 19:
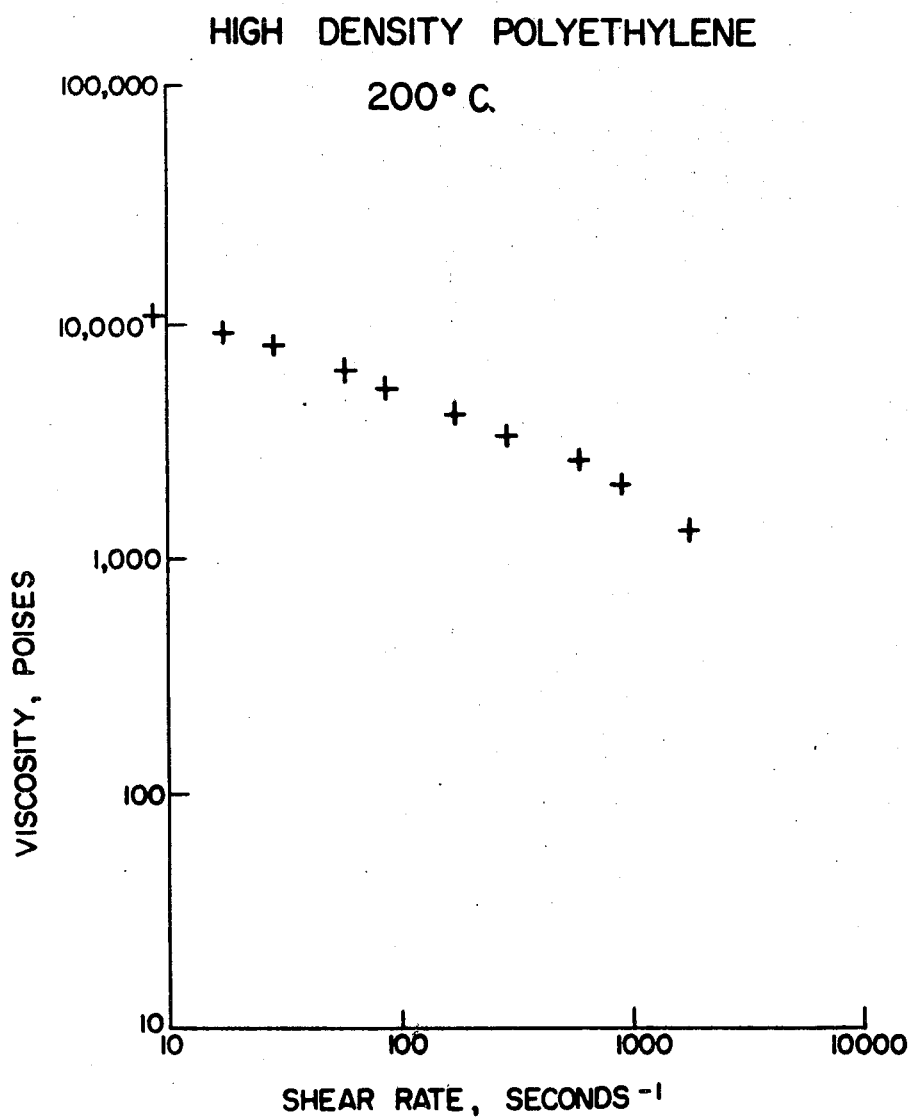
Figure 20:
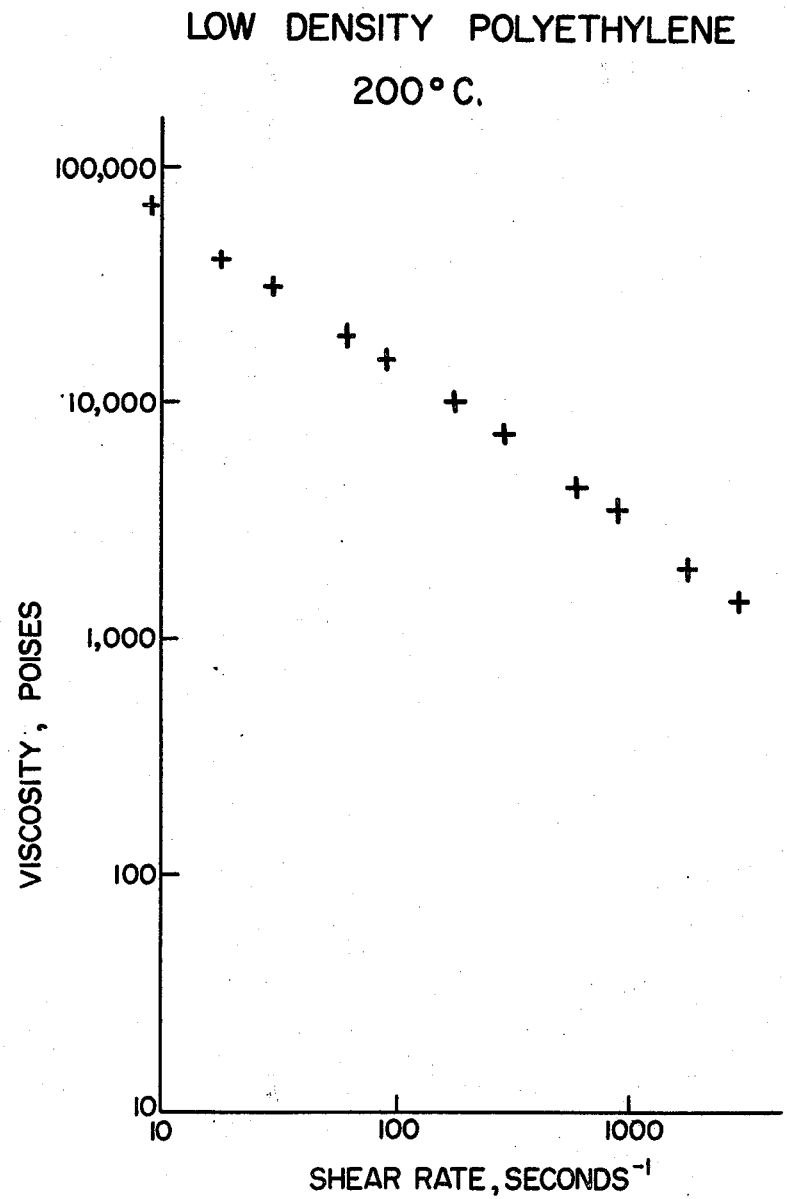
Figure 21:
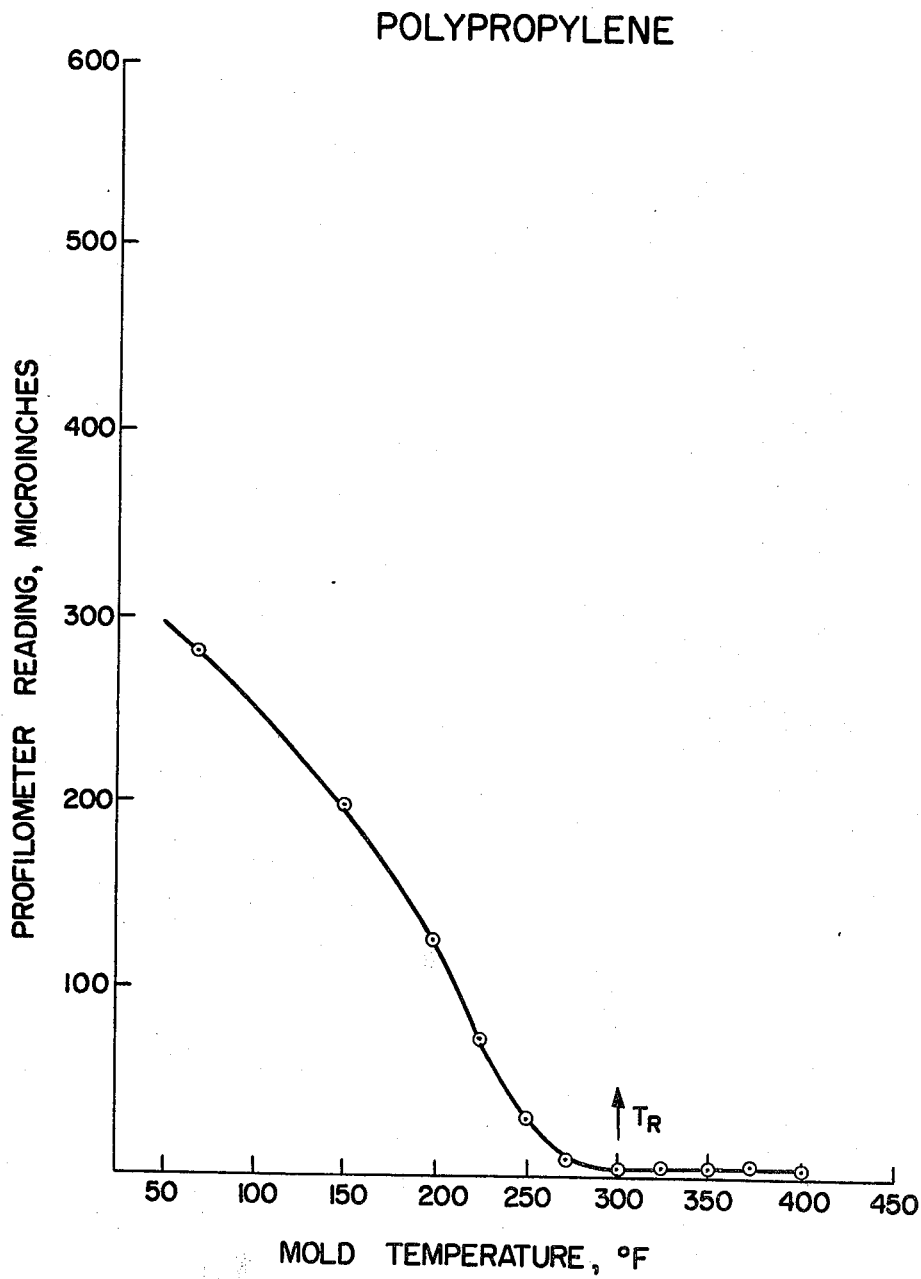
FIGS. 21 through 26 are graphs of profilometer readings versus mold temperature, for the same six thermoplastic polymers.

In order to overcome the problem that is illustrated in FIGS. 9–14, it is necessary to maintain the temperature at the interface between the flowing plastic and the inner surface of the mold, at or above the replication temperature. FIG. 9 shows the area designated B in FIG. 3, in enlarged form, and FIGS. 10–14 are enlarged views of the same area, taken sequentially, in which the molten mixture 12 has flowed progressively farther along the path of flow, the direction of flow being indicated by the arrows i each Figure. In FIG. 9, consider a bubble 36 near the center of the leading edge 32 of the flowing mixture 12. In FIG. 10, after the molten mixture 12 has flowed slightly farther along the path of flow than was shown in FIG. 9, the bubble has broken through the leading edge 32 to form a hole 38. As the molten mixture 12 continues to flow (the flow velocity being higher in the center than near the edges), the hole 38 is elongated and is moved from near the center of the leading edge 32, toward the surface of the molten mixture 12 that is adjacent to the inner surface 30 of the mold 20. This is shown in FIGS. 11 and 12. After still more flow, the hole 38 is transferred to the surface of the molten mixture 12 that is adjacent to the inner surface 30 of the mold 20, as is shown in FIGS. 13 and 14. Unless it is corrected, this hole 38 will form a streak (i.e., the outline of an elongated ellipse) on the surface of the structural foam article.

Surface defects that are the result of the phenomenon illustrated in FIGS. 9–14 (for brevity, this phenomenon will be called the "leading edge problem") have been observed only in cases wherein a no-slip boundary condition was achieved. (It may also occur, but probably to a lesser extent, when the no-slip boundary condition is not achieved. However, the skid marks and other surface defects that then occur, would tend to mask the defects caused by the leading edge problem.) The leading edge problem occurs because the central portion of the flowing plastic is moving faster than the outer portions that are adjacent to the inner surface of the mold. (The reasons for this were explained above in the discussion of the no-slip boundary condition.) The result is that the surface of the flowing plastic at the leading edge behaves in a manner that can be compared to the front edge of the end-less track of a moving tank. As the plastic flows in the mold cavity, a given element of plastic that is located on the surface near the center of the leading edge of flow, will be pushed away from that center by the next element of plastic that is emerging at the center of the flowing melt. As this process continues, the first-mentioned element of plastic will be moved away from the center toward the edge, and will eventually become part of the surface of the flowing plastic that is adjacent to the inner surface of the mold. Therefore, if that element contains a burst bubble, the bubble will be transferred to the said adjacent surface, and unless corrective action is taken, it will appear as an elongated defect on the surface of the structural foam article.

The defects that are caused by the leading edge problem are corrected by maintaining the interface between the flowing plastic and the inner surface of the mold at or above a certain temperature that is herein termed the "replication temperature." The replication temperature must be experimentally determined for any given polymer formulation (including type and molecular weight of polymer, and presence or absence of plasticizing additive), mold construction and geometry, and other processing conditions, particularly injection rate. The Examples herein contain instructions for making this determination.

The foregoing dicussion provides the theoretical basis for the results that are observed when the invention is practiced. The Examples below present concrete illustrations of the application of the principles of the invention.

The next step in the process of the invention is rigidifying the thermoplastic material after it has expanded in the mold. This can be accomplished by means such as by cooling the article enough so that it will retain its structural integrity when it is removed from the mold. Conventional heat transfer means can be employed for this purpose. With an amorphous polymer, it is usually sufficient to cool to about 20° C. below its glass transition temperature. With a crystalline polymer, a temperature of about 10° to about 50° C. below its melting point, depending upon its degree of crystallinity, is usually sufficient.

The invention employs thermoplastic polymers such as: high and low density polyethylene, polypropylene, ethylene/vinyl acetate copolymer, ethylene/ethyl acrylate copolymer, and other homopolymers and interpolymers of olefins; polystyrene and styrene copolymers such as a polymer of acrylonitrile, styrene, and butadiene; polycarbonates such as 4,4'-bisphenol-A-based polycarbonate; acetal homopolymers and copolymers; polyamides such as nylon 6 and nylon 6/6; polyaryl polyhydroxy ethers (e.g., the high molecular weight, base-catalyzed, condensation product of 4,4'-bisphenol-A and epichlorohydrin); polysulfones (i.e., a polymer that can be represented by the formula

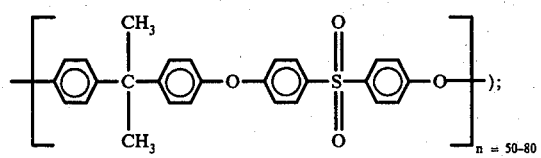

polyesters such as polyethylene terephthalate; polymethyl methacrylate and other acrylic polymers; and other thermoplastic polymers, which can be employed either singly or in mixtures. Conventional additives such as heat and light stabilizers, anti-oxidants, fillers, dyes and other colorants, can be employed in the thermoplastic polymer.

The blowing agent that is employed in the invention can be a dissolved material that is a gas at the temperature and pressure conditions in the mold cavity. Such materials include nitrogen, carbon dioxide, pentane, methylene chloride, trichloromonofluoromethane, dichlorodifluoromethane, and trichlorotrifluoroethane. The halogenated hydrocarbons, such as those illustrated above and other $C_1$ to $C_4$ halogenated aliphatic hydrocarbons are particularly interesting because they are often powerful solvents for the thermoplastic polymer. As a result, in such cases, they lower the viscosity of the polymer, and, consistent with the abovediscussed theoretical basis for the invention, enhance the operation of the invention. For instance, by using a halogenated hydrocarbon blowing agent, lower melt and mold temperatures can often be employed. Similar results can often be obtained by using higher nitrogen pressure than have heretofore been commonly employed, for instance, nitrogen pressures of at least 300 p.s.i., preferably at least 500 p.s.i., and more preferably at least 800 p.s.i. The use of higher nitrogen pressure is particularly useful with polystyrene.

Chemical blowing agents can also be employed, either alone, in mixtures thereof, or in mixtures with a dissolved material. Illustrative chemical blowing agents include azo compounds, N-nitroso compounds, sulfonyl hydrazides, sulfonyl semicarbazides, and salts and esters of azodicarboxylic acid. Specific illustrative examples include azodicarbonamide, azobisisobutyronitrile, dinitroso pentamethylene tetramine, N,N'-dinitroso-N,N'-dimethylterephthalimide, 4,4'-oxybis(benzenesulfonyl hydrazide), p-toluene sulfonyl semicarbazide, p,p'-oxybis(benzene sulfonyl semicarbazide), the barium salt of azodicarboxylic acid, and diisopropyl azodicarboxylate.

The process of the invention can be carried out in much of the equipment now being employed commercially to produce structural foam by the low pressure process. For instance, the apparatus described in Angell, U.S. Pat. No. 3,436,446, can be used to carry out the invention. The only modification that may be required in most such equipment is means to control the rate at which the foamable miture is introduced into the mold cavity, and means to control the temperature of the mold. Such means are well within the skill of the ordinary worker in the art. For instance, the rate of introduction of the foamable mixture into the mold cavity can be controlled by the use of a throttling or flow control valve at the port where the mixture is injected into the mold cavity. One such valve is disclosed in Geist, U.S. Pat. No. 3,780,764. The mold temperature can be controlled by means such as steam or hot oil channels, electrical resistance heating, and cooling water for cooling the mold to rigidify the article after it is formed in the mold.

In the Examples below, the structural foam articles were molded on an apparatus similar in all essential aspects to the one shown in FIG. 1 of Angell, U.S. Pat. No. 3,436,446. The apparatus has seven filling or injection nozzles (identified in said Angell patent as part No. 23) on 6-inch centers on a line perpendicular to the plane of the view shown in said FIG. 1. For any given operation, any one or combination of the nozzles can be used. The flow rate into the mold cavity was controlled by the use of a flow control or throttling valve, as shown in Geist, U.S. Pat. No. 3,780,764. For any given conditions (e.g., polymer, temperature, and pressure), the throttling valve is calibrated by counting the number of turns from the closed position and measuring the time elapsed for a given weight of material to flow into the mold cavity.

In many of the Examples, one of four molds was used. Mold A was rectangular in shape, 5 inches wide by 20 inches long by ½-inch thick. The injection port was circular, ⅝-inch in diameter, located midway between the sides with its center being three and one-half inches from one end. The mold material was steel, with one side being bright chrome plate. It was heated electrically*

*The temperature control with the electrically-heated molds was a little imprecise. The mold was heated up to the desired temperature, and then the electrical current to the heaters was turned off. Therefore, the actual temperatures of the mold at the time of injection may have been a few degrees different from that reported. This difference is not considered important. and cooled with water. The dimensions for this mold, and the other molds, refer to the mold cavity. The actual metal molds were flat plates that were separated by spacer frames whose heights equaled the thicknesses of the mold cavities. Gas venting in Mold A was achieved simply by the imperfect fit between the flat plates and the spacer frame. In molds B, C, and D, the rectangular end portions of the spacer frames had their height dimensions reduced by 30 mils at both the top and bottom, in order to achieve gas venting.

Mold B had a rectangular section 8 inches wide by 24 inches long, with a triangular section extending 6-½ inches out from one end. The injection port (which was ⅝-inch in diameter) was 12 inches from the square end of the mold. The mold cavity thickness was ⅜-inch. The mold material was aluminum. One side had a high polish (about 4 micro-inches), and the other side had sections with various surface patterns, including a matte finish, simulated leather, a lenticular design, and a design including dots and stars. The mold has heating and cooling channels on both sides running perpendicular to its long axis. The channels were on one inch centers. Heating and cooling can be done by hot and cold oil, or by steam and cold water.

Mold C is similar to Mold B except that the rectangular section is 26-½ inches long and the triangular section extends out 4 inches from one end.

Mold D is similar to Mold B, except that the triangular portion at one end of the Mold is not used.

Figure 36:
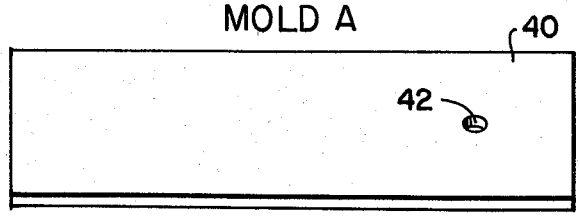
FIGS. 36 through 39 are perspective views of the mold cavities of molds A, B, C, and D.
Figure 37:
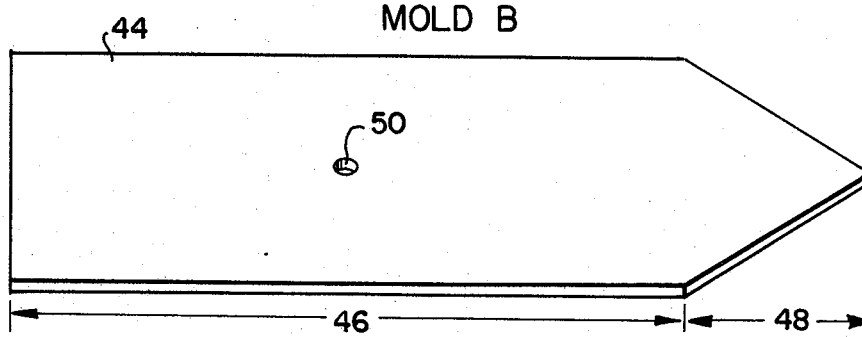
Figure 38:
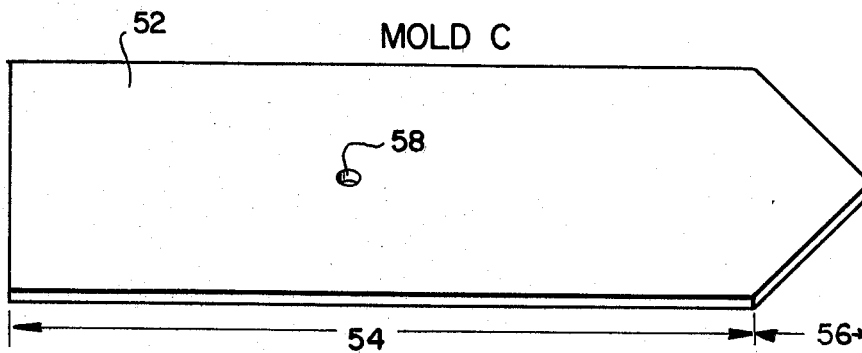
Figure 39:
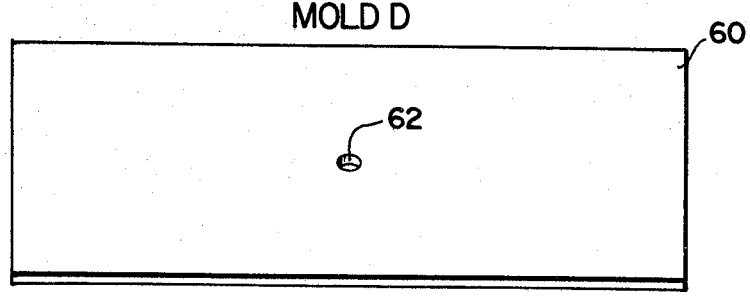

Perspective views of the cavities of Molds A, B, C, and D are shown in FIGS. 36–39, respectively. (In effect, the views illustrate the articles that can be molded in each of the said molds, except that holes are shown as the injection ports. The actual articles would have circular patterns on the surfaces at the locations of the injection ports.) Referring first to FIG. 36, Mold A 40 is shown. The mold 40 has a circular injection port 42 3-½ inches from one end, and midway between the sides. In FIG. 37, Mold B 44 is shown. The rectangular portion 46 is 24 inches long, and the triangular portion 48 extends out 6-½ inches from the rectangular portion 46. The injection port 50 was in the center of the rectangular portion 46. Mold C 52 is shown in FIG. 38. It differs from Mold B 44 in that the triangular portion 56 extends out 4 inches from the rectangular portion 54. The injection port 58 was 12 inches from the square end of the mold 52. Mold D 60 is shown in FIG. 39. It has the same dimensions as the rectangular portion 46 of Mold B 44. The injection port 62 is in the center of Mold D 60.

The experimental procedure was as follows (the apparatus referred to is the one shown in FIG. 1 of Angell, U.S. Pat. No. 3,436,446), unless otherwise indicated:

Polymer is fed into the extruder, wherein it is heated and melted. Blowing agent is added in the extruder. The molten mixture of the polymer and blowing agent is pumped from the extruder into the accumulator. The mixture is then injected from the accumulator into the mold cavity, using the above-described throttling valve to control the rate. About one minute after the end of injection, the heat is turned off, and the cooling water* is turned on. Cooling is continued for about four minutes, after which the mold is opened and the structural foam article is removed. Three or four minutes were taken between each run to reheat the mold.

During each experiment, the following parameters wee noted:

1. Melt temperature, °F. - the temperature of the molten foamable mixture;
2. Mold temperature, °F.;
3. Type of blowing agent;
4. Fill time, seconds - time for the molten foamable mixture to flow into the mold;
5. Extruder discharge pressure, p.s.i. — pressure at the discharge end, including the blowing agent;
6. Extruder barrel pressure, p.s.i. — measured in the middle of the extruder barrel, prior to the time the blowing agent was added;
7. Blowing agent pressure, p.s.i. — pressure of blowing agent at injection site;

*The temperature of the cooling water was about 20° C.

8. $\Delta P$, p.s.i. — pressure of blowing agent at injection site minus extruder barrel pressure. This measures the pressure drivig force which causes the gas to flow into the extruder barrel. It is proportional to the gas flow rate and thus to the amount of gas blowing agent put into the mixture;
9. Accumulator pressure, p.s.i.;
10. Shot weight, pounds — weight of foamable mixture injected in the production of each structural foam article; and
11. Press pressure, tona — this was the clamping pressure applied to the two halves of the mold to keep it closed during each run.

EXAMPLES 1–3

The thermoplastic polymer used in these experiments was Polystyrene A, a high impact polystyrene containing a small amount of mineral oil to increase the flow. The polymer had the following properties:

Number average molecular weight — 75,000;
Weight average molecular weight — 225,000;
Extrusion plastometer rating, by ASTM-D1238 (Condition G) about 300 milligrams per minute,
Vicat Softening Point, by ASTM-D1525, 208° F.; and
Heat Distortion Point, by ASTM-D648, 185° F.

Mold C was used to produce three structural foam articles. The process parameters were as shown below in Table I.

TABLE I

|  | Example | | |
| --- | --- | --- | --- |
|  | 1 | 2 | 3 |
| Melt Temp., ° F. | 450 | 450 | 450 |
| Mold Temp., ° F. | 200 | 200 | 340 |
| Blowing agent | $N_2$ | $N_2$ | $N_2$ |
| Fill Time, sec. | 23 | 20 | 21 |
| Extr. Pressure, disch., psi | 3200 | 3200 | 3200 |
| Extr. Pressure, barrel, psi | 1650 | 1650 | 1650 |
| Blowing agent pressure, psi | 1850 | 2250 | 1850 |
| $\Delta P$, psi | 200 | 600 | 200 |
| Accum. pressure, psi | 3000 | 3000 | 3000 |
| Shot weight, lbs. | 2.3 | 2.28 | 2.29 |
| Press pressure, Tons | 15 | 15 | 15 |

The article produced in Example 1 had a surface containing streaks indicative of the leading edge problem. The articles of Example 2 and 3 had good surfaces having only a very few streaks at the ends, probably because there was little or no flow over the last few inches. The added nitrogen pressure in Example 2 acted as a solvent to lower the viscosity of the melt, thereby lowering the replication temperature. Examples 2 and 3 also illustrate the fact that some flow is needed in order to achieve faithful replication. Therefore, overflow ports or provision for some "flashing" may be needed, in order to ensure faithful replication from the area near the filling port all the way to the far end of the piece. With pieces of the weight and dimensions of these Examples 1–3, an overflow of the order of 0.1 pound would have been sufficient to obtain the desired flow at the far end. With pieces of different dimensions, correspondingly more or less overflow would be needed. It is well within the skill of the art to determine the needed overflow.

It is considered that a no-slip boundary condition was achieved in each of Examples 1–3. The streaks reported were caused by the leading edge problem.

In the foregoing Examples, as in most of the Examples presented herein, there is a large difference between the temperature of the melt and the temperature of the mold. In such cases, the temperature at the polymer/mold nterface will approach the mold temperature rather than the melt temperature, because the thermal conductivity of the metal molds used herein is so much higher than that of the melt.

EXAMPLES 4–7

In these examples, Polystyrene B was employed. It is the same basic polymer as Polystyrene A, but the plasticizing mineral oil is omitted. The molecular weights are the same as Polystyrene A; the other characterizing properties are the following:

Extrusion plastometer — 250 milligrams/minute
Vicat softening point — 215° F.
Heat distortion point — 190° F.

Mold B was used to produce four structural foam articles. (The injection port for the mold in these examples was in the tip of the triangular section of the mold.) In Example 5, the blowing agent, designated FC (for "fluorocarbon"), was dichlorodifluoromethane. The process parameters were as shown below in Table II.

TABLE II

|  | EXAMPLE | | | |
|---|---|---|---|---|
|  | 4 | 5 | 6 | 7 |
| Melt Temp., ° F. | 450 | 450 | 450 | 450 |
| Mold Temp., ° F. | 350 | 320 | 280 | 320 |
| Blowing agent | $N_2$ | FC | $N_2$ | $N_2$ |
| Fill Time, sec. | 24 | 21 | 20 | 18 |
| Extr. Pressure, disch., psi. | 3300 | 3400 | 3400 | 3400 |
| Extr. Pressure, barrel., psi. | 1750 | 1750 | 1750 | 1750 |
| Blowing agent pressure, psi. | 1950 | 3000 | 2750 | 2750 |
| $\Delta$ P, psi. | 200 | n/a* | 1000 | 1000 |
| Accum. pressure, psi. | 3000 | 3000 | 3000 | 3000 |
| Shot weight, lbs. | 2.0 | 1.87 | 2.25 | 2.25 |
| Press pressure, tons | 50 | 50 | 50 | 50 |

*The fluorocarbon blowing agent was used in proportions of 10 parts by weight per 100 parts by weight of polystyrene.

Figure 7:
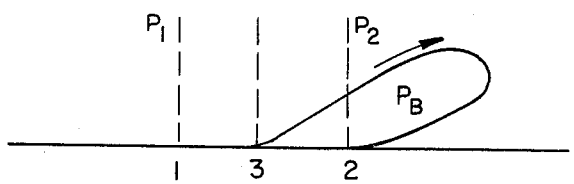
Figure 8:
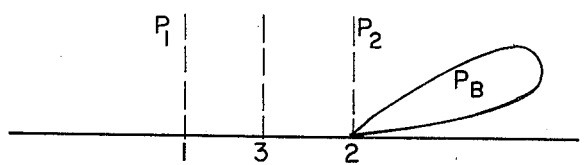

The article of Example 4 had defects on the surface that resembled the bubble shown in FIG. 7.

The article of Example 5 was excellent. There was virtually perfect replication of the mold surface, except for the last inch of flow, where there were a few streaks.

The articles of Examples 6 and 7 were both quite good, with Example 7 being a little better. The difference between Examples 6 and 7 was that there were a few streaks in the last 5 or 6 inches of the end away from the filling port in Example 6, whereas Example 7 was good down to the end. Except as noted, the replication of the mold surface was near perfect in these two articles.

By proper mold design, the conditions of Example 6 could undoubtedly be employed to produce a commercially acceptable article. For instance, the use of an overflow cavity provides adequate flow down to the end of the molded article, with the overflow being trimmed off.

It is instructive to compare Example 4 with Example 3. The presence of the small amount of plasticizer in Example 3 enabled the production of an acceptable article at 340° F. (mold temperature), whereas, at 350° F. without the plasticizer, the surface was unacceptable.

EXAMPLES 8–12

Mold A was employed to produce structural foam articles from a high density polyethylene having a Melt Index of 8 and a density of 0.96. The process parameters were as shown below:

TABLE III

| Melt Temp., ° F. | 340 |
|---|---|
| Mold Temp., ° F. | 275 |
| Blowing agent | $N_2$ |
| Fill time, sec. | varied |
| Extr. Pressure, disch., psi | 3400 |
| Extr. Pressure, barrel, psi | 1400 |
| Blowing agent pressure, psi | 1600 |
| $\Delta$ P, psi | 200 |
| Accum. pressure, psi | 3200 |
| Shot weight, lbs. | 1.2 |
| Press pressure, Tons | 15 |

The fill times were varied as shown below in Table IV.

TABLE IV

| Example | Fill Time, Seconds | Remarks |
|---|---|---|
| 8 | about 1.5 | Blisters and pock marks |
| 9 | 5 | Blisters and pock marks |
| 10 | 9 | Some blisters and pock marks, and streaks near the end of the mold |
| 11 | 16 | Surface good for two-thirds of the mold, from the fill port to the opposite end; thereafter a few pock marks and streaks; there were a few blisters under the sprue |
| 12 | 27 | Same as 11, except that the last third was better. |

Under the conditions of Examples 11 and 12, the flow was insufficient near the end of the mold cavity to eliminate all the surface imperfections. Therefore, a few pock marks and streaks were obtained in this region.

Attempts to mold structural foam articles having faithful surface replication in Mold A from a high density polyethylene having a Melt Index of about 0.1, using the same general conditions stated in Examples 8–12, except that the melt temperature was 450° F., the mold temperature was 275° or 325° F., the $\Delta$ P was 300 p.s.i., and the fill times were up to 103 seconds, were singularly unsuccessful. The surface imperfections were gross! Plasticization of the polymer would undoubtedly be necessary in order to successfully produce a good surface in this thin section mold. That plasticization, as by using a solvating blowing agent, would work can be inferred from Examples 11 and 12, since the polymer of those examples can be considered to be a plasticized version of the 0.1 Melt Index material.

EXAMPLES 13-17

In this series, Mold D was used to produce structural foam articles from Polystyrene A. The procedure differed from that of the previous Examples in that a cooler mold was used, and it was attempted to achieve the replication temperature at the polymer/mold interface principally by heating the melt to a higher temperature. In order to prevent too rapid heat drain from the melt into the mold (which acts as a heat sink), which would reduce the temperature at the interface below the replication temperature, on the bottom side of the mold cavity a thin layer of an insulating material was placed between the main body of the mold and a layer of metal sheet or foil, which then comprised the inner surface of the mold. For comparison purposes, the top side of the mold had no insulating layer.

The structural foam article was left in the press for 3 minutes after the end of injection, and was then removed. In these examples, it was not necessary to reheat the mold after each run. The alternate heating and cooling of the mold during each cycle was thereby eliminated.

The description of the insulating layer and metal foil or sheet used in each of these Examples is the following:

TABLE V

| Example | Insulating Layer | Metal Layer |
|---|---|---|
| 13 | ⅛-inch compacted asbestos fiber sheet | 5-mil, aluminum foil |
| 14 | 30-mil compacted asbestos fiber sheet | 5-mil, aluminum foil |
| 15 | ⅛-inch compacted asbestos fiber sheet | 37-mil stainless steel plate |
| 16 | 30-mil compacted asbestos fiber sheet | 15-mil tin-plated steel plate |
| 17 | 30-mil compacted asbestos fiber sheet | 15-mil tin-plated steel plate |

The process parameters of these Examples were as shown below in Table VI:

TABLE VI

| | 13 | 14 | 15 | 16 | 17 |
|---|---|---|---|---|---|
| Melt Temp., °F. | 510 | 510 | 510 | 510 | 510 |
| Mold Temp., °F. | 70 | 70 | 70 | 70 | 160 |
| Blowing Agent | $N_2$ | $N_2$ | $N_2$ | $N_2$ | $N_2$ |
| Fill Time, sec. | 21 | 24 | 21 | 24 | 24 |
| Extr. Pressure, disch., psi | 3200 | 3200 | 3200 | 3200 | 3200 |
| Extr. Pressure, barrel, psi | 1600 | 1650 | 1600 | 1650 | 1650 |
| Blowing agent pressure, psi | 2400 | 2450 | 2400 | 2450 | 2450 |
| Δ P, psi | 800 | 800 | 800 | 800 | 800 |
| Accum. pressure, psi | 3000 | 3000 | 3000 | 3000 | 3000 |
| Shot weight, lbs. | 2.02 | 2.06 | 2.02 | 2.06 | 2.06 |
| Press pressure, tons | 15 | 15 | 15 | 15 | 15 |

Description of the results

Example 13 — The cold side (i.e., the top side where no insulating layer was used) had the wood grain-like surface pattern that is characteristic of commercial structural foam. The bottom side showed excellent replication. It was glossy and clearly showed the dimpled surface of the asbestos sheet, which showed through the aluminum foil. There were a very few streaks at the extreme ends of the article.

Example 14 — The cold side was the same as Example 13. The bottom side had quite good replication, but there was more streaking at the ends than with Example 13.

Example 15 — The cold side was the same as Example 13. The bottom had perfect replication only for a radius of about three inches around the filling port. Thereafter, streaking occured.

Example 16 — The cold side was the same as in Example 13. The bottom side had fairly good replication, but there was some streaking toward the ends.

Example 17 — The top side had a few skid marks and streaks. The bottom side was excellent. Perfect replication of the mold surface was obtained, with a complete absence of defects of any kind.

This series of Examples 13 -17 illustrates a highly preferred mode of carrying out the invention. In accordance with this preferred mode, the mold is divided into a body portion having a relatively high heat capacity, a metal foil or sheet or other member having a relatively low heat capacity which comprises the inner surface of the mold, and a thermal insulating layer between said body portion and said member. The body portion is maintained at a substantially constant temperature that is below the replication temperature at which it is desired to maintain the mold/polymer interface while the polymer is blowing in the mold. Preferably, the body portion is maintained at a temperature cool enough to rigidify the polymer. The melt being introduced into the mold cavity is at a temperature above the replication temperature. The layer of insulation is thick enough to prevent the cooler body portion of the mold from reducing the temperature at the mold-/polymer interface below the replication temperature until after the mixture has finished blowing in the mold cavity. It is, however, preferably thin enough so that the polymer can be cooled, by heat flow into the body portion, within a reasonable period of time to a temperature sufficiently low to rigidify it. Of course, the member having a relatively low heat capacity (which comprises the inner surface of the mold) can be integral with the insulating layer.

EXAMPLE 18

In this Example, a procedure is described for determining the replication temperature. The following six thermoplastic polymers were used:

TABLE VII

| Polymer | Heat Distortion[1] Point, °C. | Vicat[2] Softening Point, °C. | Melt[3] Index (Grams/10 min.) |
|---|---|---|---|
| Polypropylene (Hercules Profax 6523) | 58.2 | 149.5 | 1.82 |
| Polystyrene A | 80.2 | 98.9 | 0.31 |
| Polystyrene C | 75.3 | 92.2 | 0.93 |
| ABS[4] (Borg-Warner Cycolac EP-3510) | 79.9 | 99.7 | 0.28 |
| High Density (0.96) Polyethylene | 46.0 | — | 7.13 |
| Low Density (0.92) Polyethylene | — | 95.7 | 0.26 |

[1] By ASTM-D648
[2] By ASTM-D1525, 5°-6°/minute
[3] By ASTM-D-1238, Condition E
[4] Acrylonitrile-Butadiene-Styrene Terpolymer These six polymers were further characterized by measuring their viscosities at 200° C. at various shear rates, on an Instron Model 3211 Capillary Rheometer. The results of these measurements are shown in the graphs included herewith as FIGS. 15–20.

The rheometer was operated in the "Constant Shear Rate" mode, using a die having a diameter of 0.04 inch and a length of 0.0870 inch. The viscosity is proportional to the shear stress (calculated by known methods from the recorded load) divided by the shear rate.

A series of structural foam articles were produced from each of these polymers, using the generalized procedure with Mold A, and the following conditions:

TABLE VIII

|  | Poly-propylene | Poly-styrene A | Poly-styrene C | ABS | HDPE | LDPE |
|---|---|---|---|---|---|---|
| Melt Temp., °F. | 440 | 440 | 440 | 475 | 380 | 440 |
| Mold Temp., °F. | Varied | Varied | Varied | Varied | Varied | Varied |
| Blowing agent | $N_2$ | $N_2$ | $N_2$ | $N_2$ | $N_2$ | $N_2$ |
| Fill Time, sec. | 18–21 | 34–42 | 26–30 | 25–39 | 23–27 | 39–58 |
| Extr. Pressure, disch., psi | 2700 | 2800 | 2800 | 2700 | 2700 | 2700 |
| Extr. Pressure, barrel., psi | 750 | 1100 | 1100 | 1400 | 700 | 1200 |
| Blowing agent pressure, psi | 1150 | 1500 | 1500 | 1800 | 1100 | 1800 |
| Δ P, psi | 400 | 400 | 400 | 400 | 400 | 600 |
| Accum. pressure, psi | 2400 | 2700 | 2700 | 2400 | 2400 | 2400 |
| Shot weight, lbs. | 1.1 ± 0.1 | 1.4 ± 0.1 | 1.5 ± .08 | 1.5 ± 0.15 | 1.15 ± .05 | 1.35 ± .05 |
| Press pressure, Tons | 15 | 15 | 20 | 15 | 15 | 15 |

The several structural foam articles were produced using fill rates and other process conditions that yielded no-slip boundary conditions at the interface between the flowing plastic and the inner surface of the mold. These conditions were held essentially constant for a given polymer, with the mold temperature being varied, usually in 25° F. increments. The articles were then measured for surface smoothness on the side opposite the sprue, using a profilometer that measures surface imperfections ("peaks" and "valleys") in microinches. The procedure was the following: The longitudinal axis of the article was approximated. The arm and stylus of the profilometer were then passed over a series of one-inch, imaginary lines that intersected and were perpendicular to said axis. They were located 16, 14, 12, 10, 8, and, sometimes, 6 inches from the end closest to the sprue. The average of these five or six readings were taken as the profilometer value of the article. The results are plotted in graphs of profilometer value (in microinches) versus mold temperature. The graphs are included herewith as FIGS. 21–26. In interpreting the graphs, a lower reading is indicative of a smoother surface, the limit being the smoothness of the mold (about 5 microinches). The replication temperature is that mold temperature above which no significant reduction in the profilometer reading is obtained.

The profilometer employed was a Type VB Mototrace Model 5, which was obtained from the Micrometrical Division of Bendix Corporation. It was operated at a tracing speed of 0.3 inch/second. The meter on the instrument gives a direct read-out in microinches. For each reading, an average was taken.

The results of the profilometer masurements agree with visual observations. The visual analyses of the same articles are presented in the following tables:

TABLE IX

| Mold Temperature, °F. | Polypropylene Remarks |
|---|---|
| 225 and lower | Streaks |
| 250 | Streaks |
| 275 | Few unhealed bubbles |

TABLE IX-continued

| Mold Temperature, °F. | Polypropylene Remarks |
|---|---|
| 300 | Faithful replication, except for a few scattered pock marks |
| 325 | OK |
| 350 and higher | OK |

TABLE X

| Mold Temperature, °F. | Polystyrene A Remarks |
|---|---|
| 200 and lower | Streaks |
| 250 | Streaks, but better |
| 275 | Streaks beginning midway between sprues and end |
| 300 | Partially healed streaks last third of part |
| 325 | Almost healed streaks last quarter of part |
| 350 | Faithful replication |
| 375 and higher | OK |

TABLE XI

| Mold Temperature, °F. | Polystyrene C Remarks |
|---|---|
| 225 and below | Streaks |
| 250 and 275 | Minor streaking |
| 300 | Very minor streaking |
| 325 | Faithful replication |
| 350 and higher | OK |

TABLE XII

| Mold Temperature, °F. | Acrylonitrile-Butadiene-Styrene Terpolymer Remarks |
|---|---|
| 250 and below | Streaks |
| 300 | Fewer streaks |
| 350 | Very minor streaking |
| 375 | Very minor streaking |
| 400 and above | Faithful replication |

TABLE XIII

| Mold Temperature °F. | High Density Polyethylene Remarks |
|---|---|
| 245 and below | Streaks |
| 270 | OK, except for streaks in last 5 inches (insufficient flow) |
| 300 | OK, except for minor streaking last 3–4 inches |
| 325 and 350 | OK, except for minor streaking last 2 inches |

TABLE XIII-continued

| Mold Temperature °F. | High Density Polyethylene Remarks |
|---|---|
| 370 and above | OK |

TABLE XIV

| Mold Temperature °F. | Low Density Polyethylene Remarks |
|---|---|
| 350 | Unhealed pock marks |
| 375 | Unhealed pock marks, but better |
| 400 | OK, except at end |
| 460 and higher | OK |

The visually determined replication temperatures are indicated on the graphs (FIGS. 21–26) as $T_R$.

It must be emphasized that the particular values for replication temperatures obtained herein hold only for the particular polymer formulations, melt temperatures, fill rates and other process parameters, nozzle design, and mold geometry and construction (including surface characteristics), that were employed in these experiments. However, the replication temperatures for other polymer formulations, melt temperatures, fill rates, process parameters, nozzle designs, and/or mold geometry and construction, can be determined in a similar manner.

The evaluation of the surface smoothness may be done by visual observation, by optical means, or by other mechanical means, rather than by using a profilometer. Further, instead of varying the mold temperature, other parameters can be varied. Such other parameters include melt temperature, nature and proportion of blowing agent, plasticizing additives, fill rate, number of filling ports, or a combination of these. In most cases, the replication temperature will be determined by varying the mold temperature, the melt temperature, or both. In any event, no matter what process parameter or combination of parameters is varied, the principle is the same — the determination of those conditions wherein higher temperature, slower fill rate, etc., fail to yield a part having significantly improved surface replication. The thus determined temperature, then, is the replication temperature for the specific polymer formulation, fill rate, nozzle design, mold construction and geometry, etc., employed in the determination.

Figure 22:
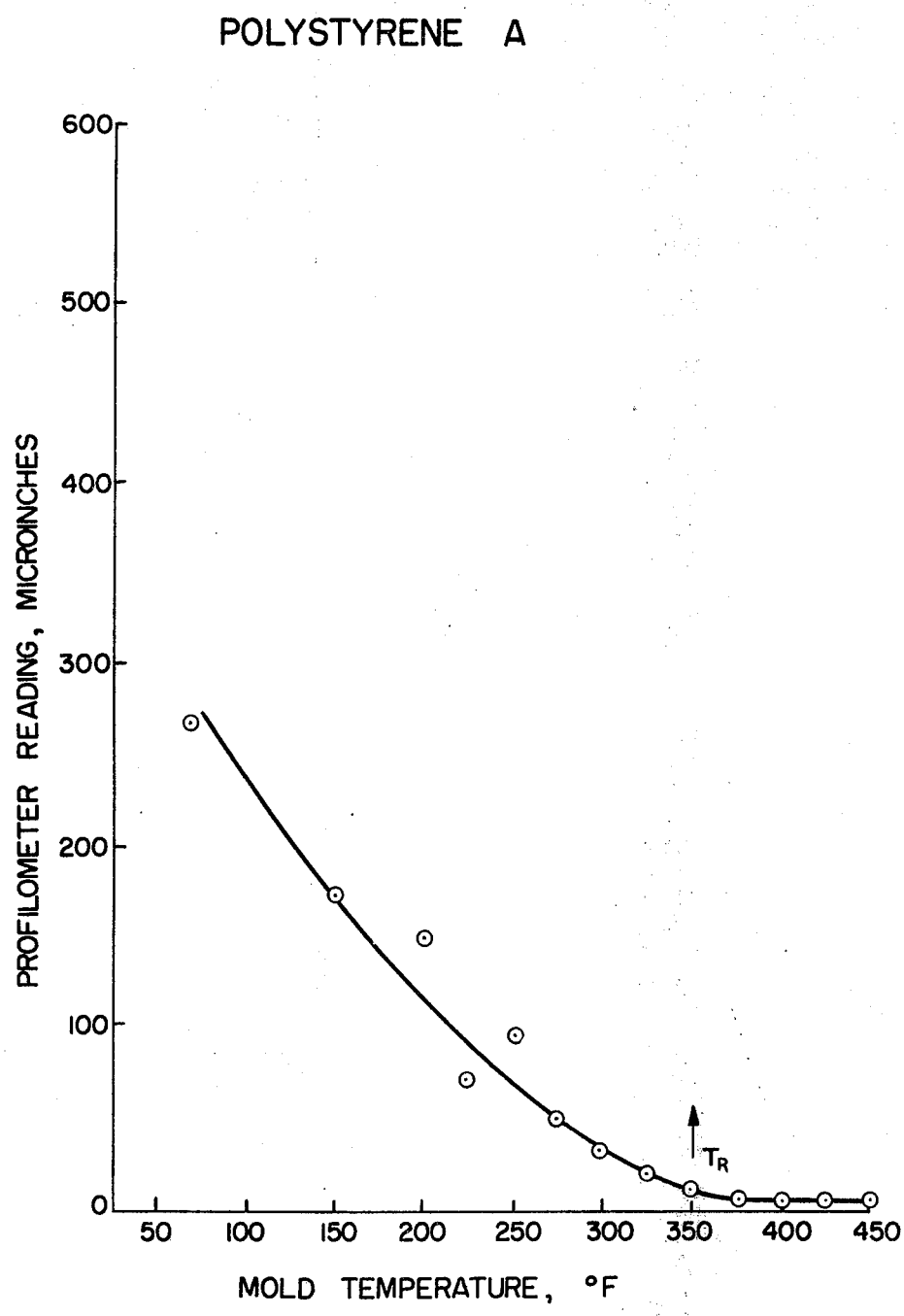
Figure 23:
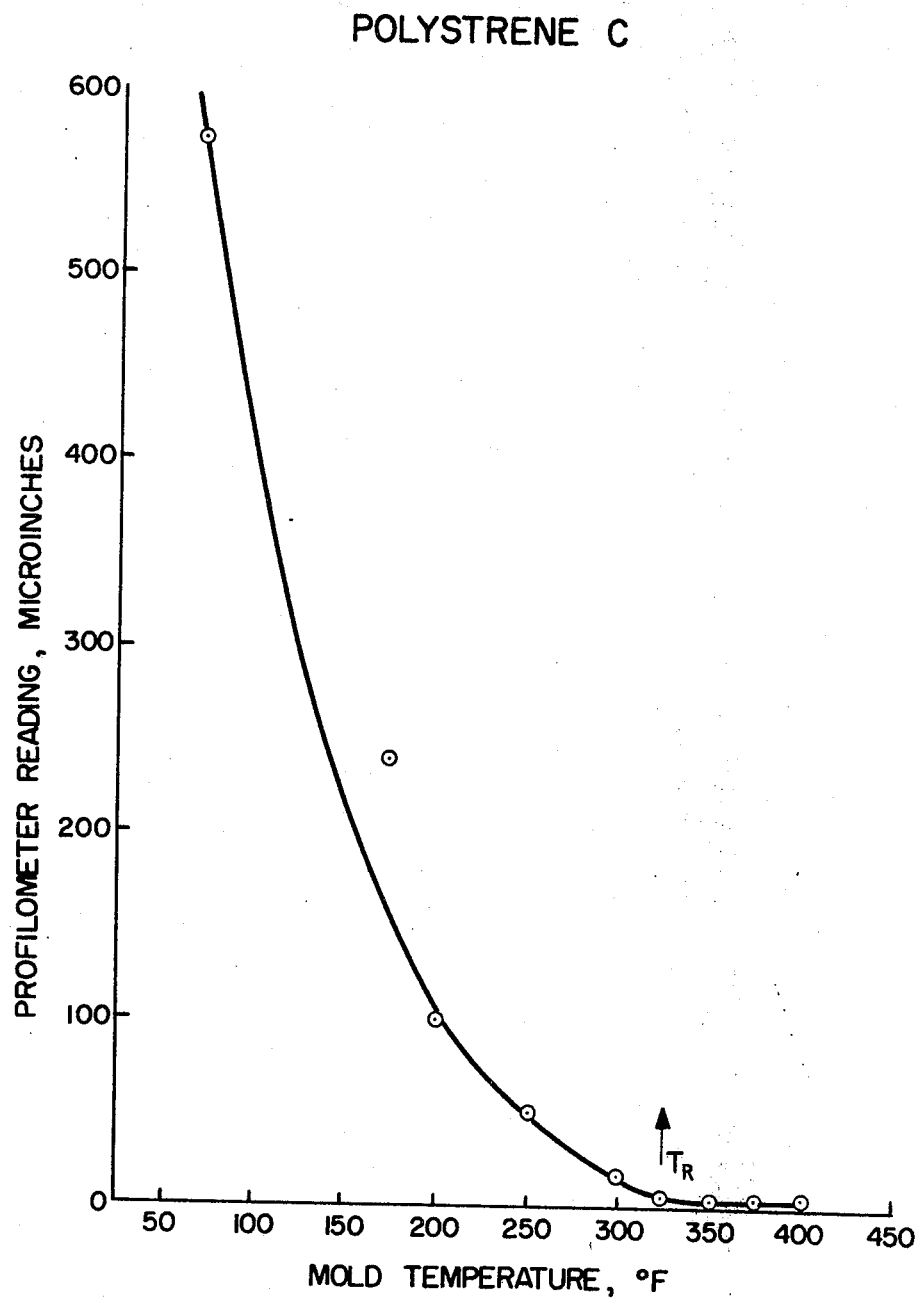
Figure 24:
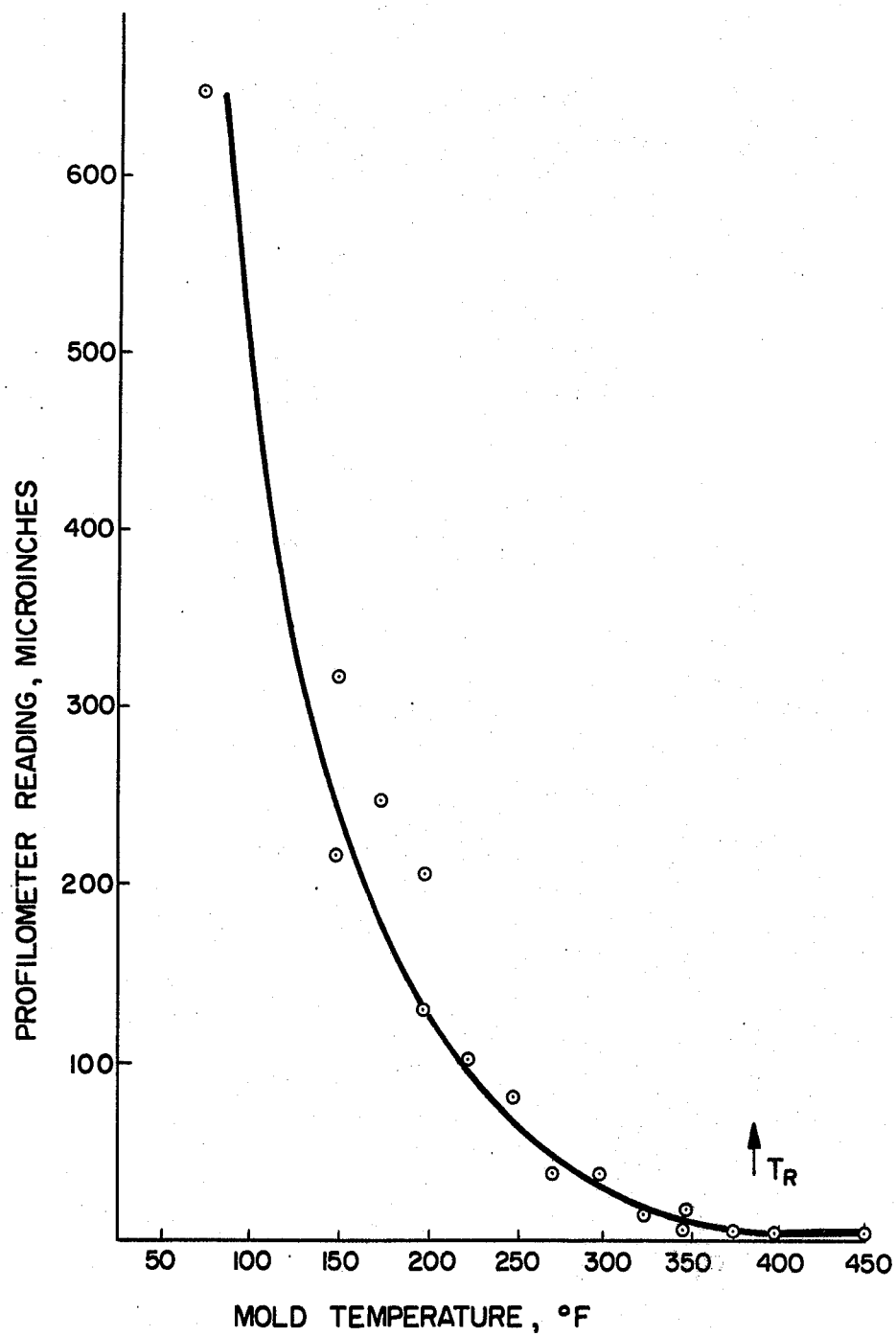
Figure 25:
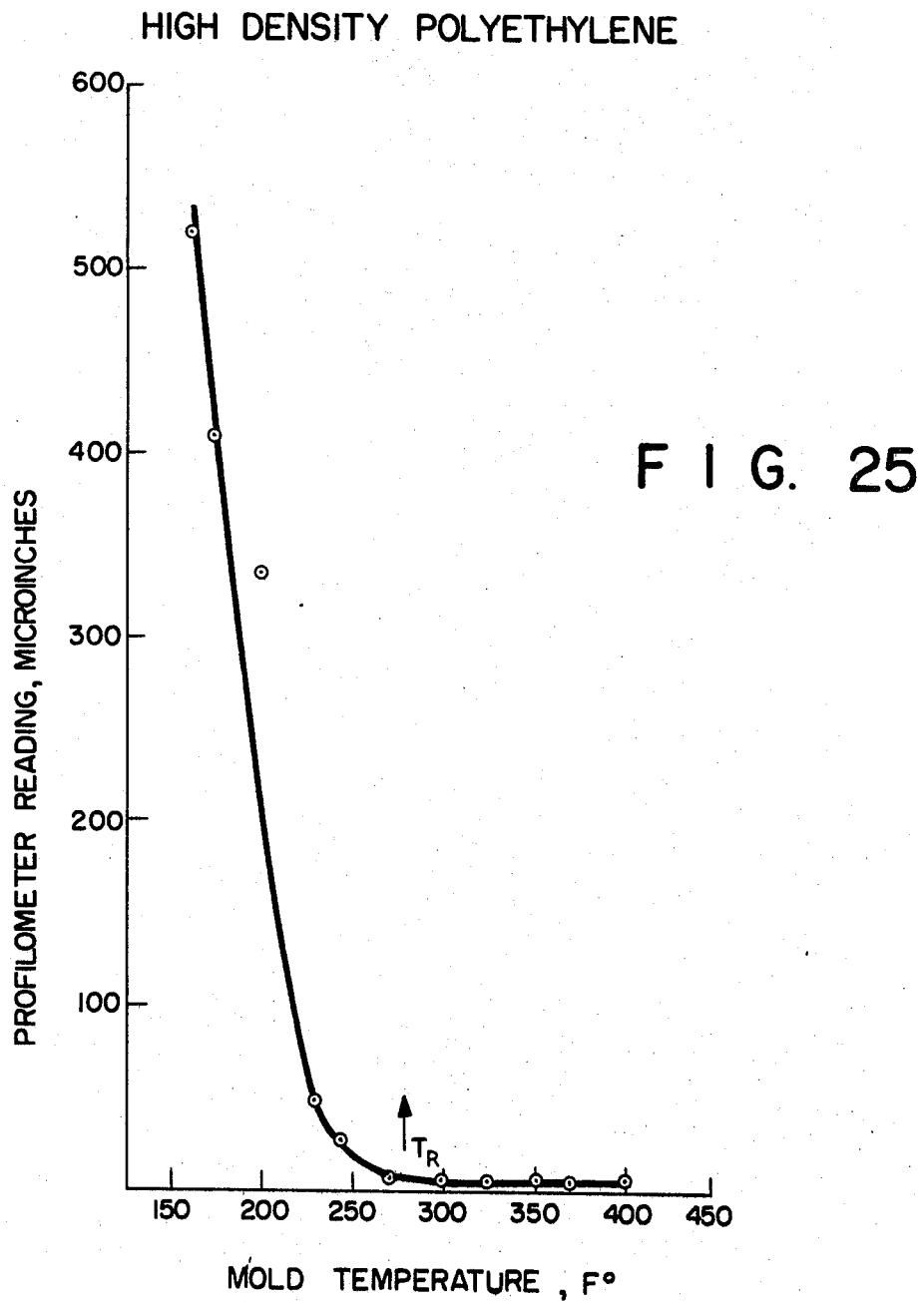
Figure 26:
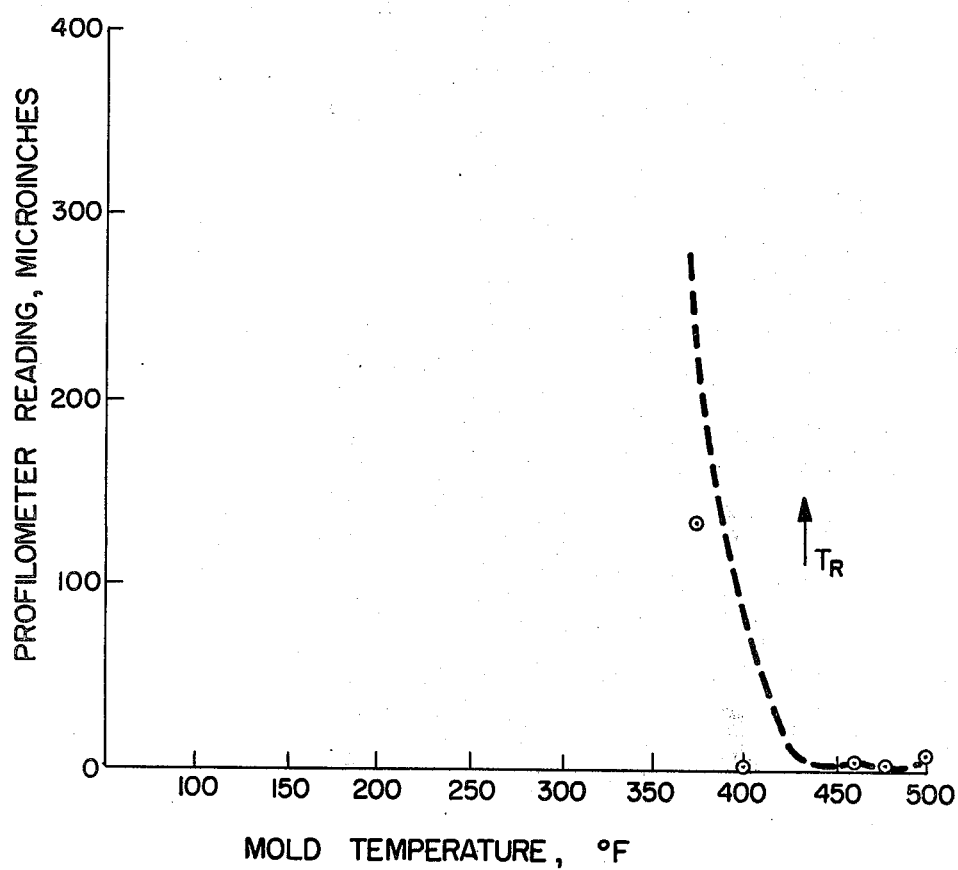
Figure 27:
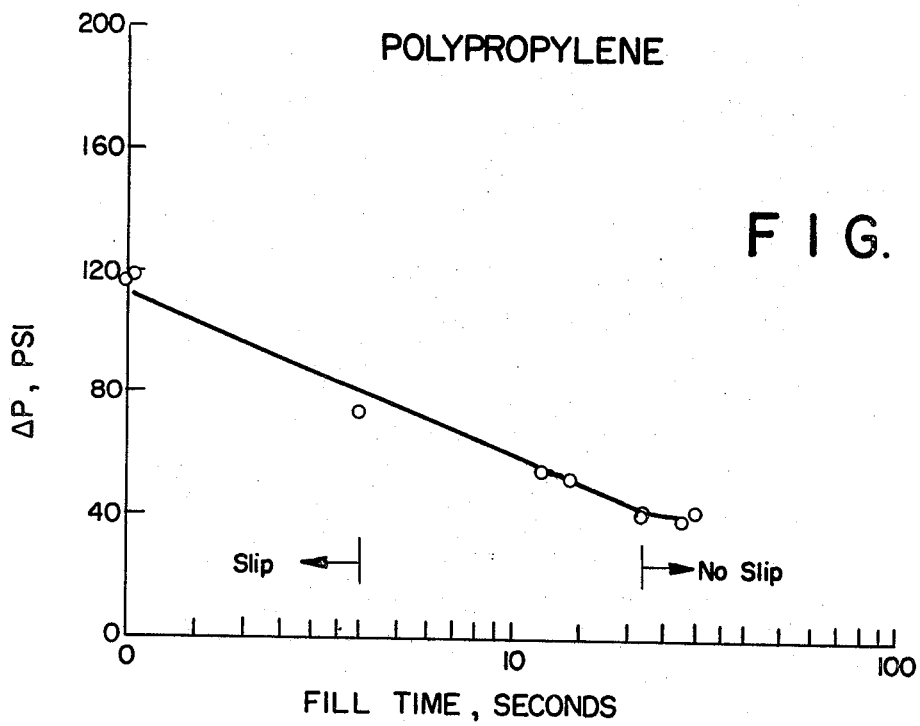
Figure 28:
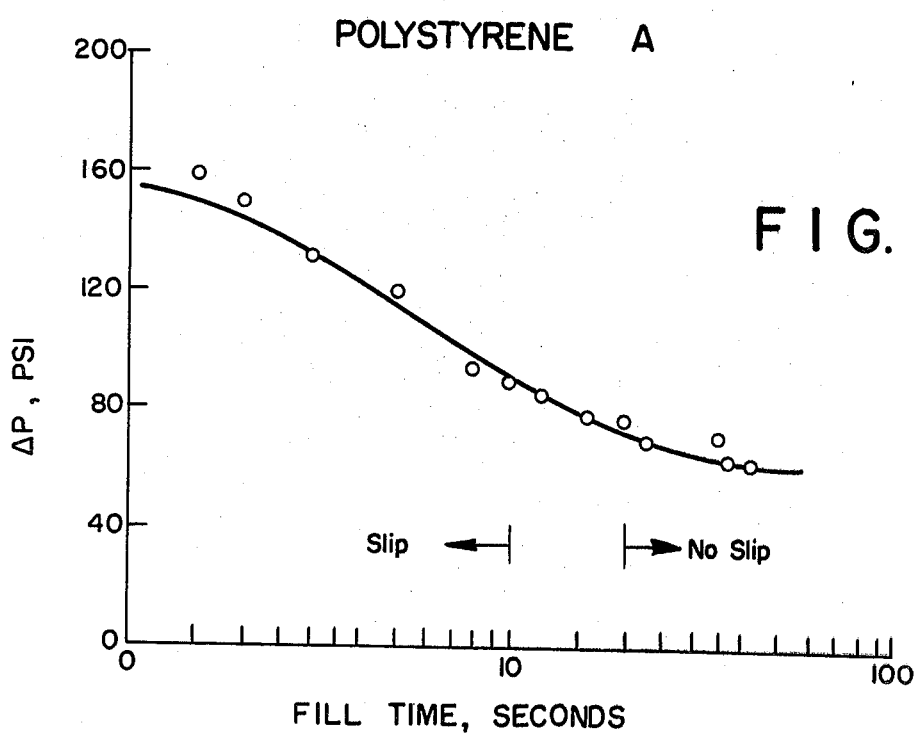
Figure 31:
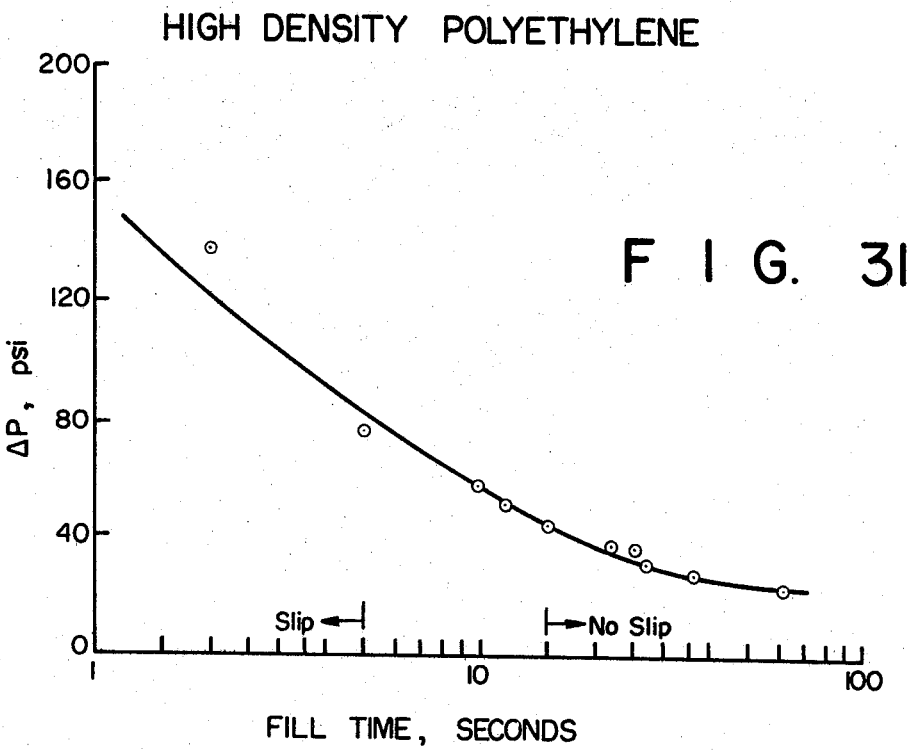
Figure 32:
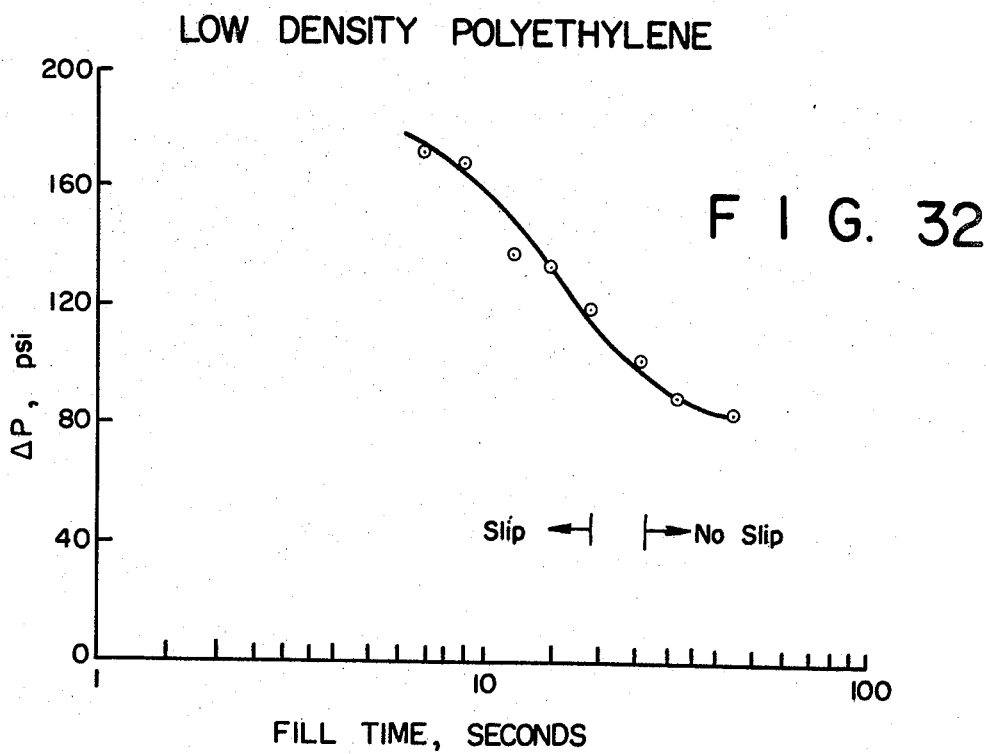

For some end-use applications, it may not be necessary to produce a part having absolutely faithful surface replication. Such cases may arise because the part is to be painted (the paint would mask minor surface defects), or for some other reason. It would therefore be within the spirit of the invention to achieve a predetermined, controlled degree of replication. As a specific illustration, FIG. 22 shows the replication temperature (under the conditions of the experiment) of Polystyrene A to be attained at a mold temperature of about 350° F. In some cases, the degree of replication achieved at a mold temperature of, say, 275° or 300° F., may be acceptable. It would be measurably less expensive to operate using the lower mold temperature, because less energy would be required for heating and cooling, and shorter cycling times would be possible.

The experiment described in Example 18 is an analytical method of verifying the visual determination of when mold replication occurs when a single molding process parameter (here-mold temperature) is varied.

EXAMPLE 19

In this Example, a procedure is described for determining a fill time that will enable a no-slip boundary condition to be maintained at the interface between the flowing thermoplastic and the inner surface of the mold.

A steam-heated aluminum mold having a 6-inch by 21-inch by ½-inch mold cavity was employed in the apparatus described above. The mold contained one sprue or injection port, ⅝-inch in diameter, the center of which was 2-⅞ inches from one end of the cavity. The bottom of the mold contained four flush-mounted, ⅞-inch diameter pressure transducers located at varying distances along the long axis of the mold. The transducers were connected to an instrument which continuously recorded the pressure at each one during the time that the plastic was filling the mold. The first two transducers, which are the ones that particularly concern us here, were located 4-3/16 and 9-3/16 inches, respectively, from the sprue end of the mold. (The distances are to the centers of each transducer).

A series of structural foam articles were made from the six polymers described above in Example 18. The conditions employed in the experiments are described below in Table XV:

TABLE XV

|  | Polypropylene | Polystyrene A | Polystyrene C | ABS | HDPE | LDPE |
|---|---|---|---|---|---|---|
| Melt Temp., °F. | 460 | 450 | 470 | 480 | 395 | 380 |
| Mold Temp., °F. | 230 | 360 | 280 | 360 | 245 | 360 |
| Blowing agent | $N_2$ | $N_2$ | $N_2$ | $N_2$ | $N_2$ | $N_2$ |
| Fill Time, sec. | Varied | Varied | Varied | Varied | Varied | Varied |
| Extr. Pressure, disch., psi | 2700 | 2800 | 2800 | 3500 | 2700 | 2800 |
| Extr. Pressure, barrel, psi | 750 | 1100 | 1100 | 2000 | 500 | 900 |
| Blowing agent pressure, psi | 1150 | 1500 | 1500 | 2400 | 900 | 1300 |
| Δ P, psi | 400 | 400 | 400 | 400 | 400 | 400 |
| Accum. pressure, psi | 2400 | 2700 | 2700 | 3200 | 2400 | 2300 |
| Shot weight, lbs. | 1.58 ± .03 | 1.74 ± .07 | 1.63 ± .03 | 1.79 ± .07 | 1.67 ± .09 | 1.68 ± .07 |
| Press pressure, Tons | 20 | 20 | 20 | 50 | 15 | 20 |

The pressure drop between the first two transducers during the filling of the mold was determined at various fill times. This data is presented herewith in FIGS. 27–32, as graphs of the pressure drop, Δ P, versus fill time. (The pressure drop is directly proportional to the shear stress.) The graphs also indicate the fill times below which there was a slip condition, and above which there was a no-slip condition, as determined by visual observation of the parts. These visual observations are displayed below in Tables XVI through XXI.

TABLE XVI

| Fill Time, Seconds | Polypropylene Remarks |
|---|---|
| 1 | Slip - scales and fracture |
| 4 | Slip - scales and fracture |
| 12 | Minor slipping, otherwise OK |
| 14 | Very minor slipping, otherwise OK |
| 22 and above | OK; no-slip |

TABLE XVII

| Fill Time, Seconds | Polystyrene A Remarks |
|---|---|
| 10 and below | Slip-Pin holes on surface |
| 12 and 16 | Difficult to determine - slipping may have occurred, causing minor surface defects that were almost completely healed by high mold temperature |
| 20 and 23 | No-slip; insufficient flow at end left a few defects there |
| 35 and above | OK; no-slip |

TABLE XVIII

| Fill Time, Seconds | Polystyrene C Remarks |
|---|---|
| 1 | Slip - Pock marks and scales |
| 2 | Slip - scales |
| 3 | Slip - scales, fracture, some pock marks |
| 6 | Slip - scales and fracture |
| 9 | Slip - scales and pock marks |
| 10.5 | Slip, but minor a few pock marks and scales |
| 13–20 | No evidence of slipping - a few unhealed pock marks (leading edge problem) |
| 23 | No slip; OK, except for a very few pock marks at end |

In this experiment, the no-slip boundary condition was obtained with fill times of 13 seconds and longer. However, the leading edge problem was not corrected (at this fairly low mold temperature) until the fill time was 23 seconds. It is instructive to compare this experiment with Example 18, in which, using a different mold (having different surface, thermal conductivity, and heat flux characteristics) but the same polymer, a replication temperature of about 325° F. was obtained for fill times of 26–30 seconds.

TABLE XIX

| Fill Time, Seconds | Acrylonitrile-Butadiene-Styrene Terpolymer Remarks |
|---|---|
| 12 and lower | Pock marks and skid marks |
| 18 | Few pock marks and minor slipping |
| 28 | No-slip, but leading edge problem not completely corrected |
| 33 | No-slip; OK, except at ends |
| 39 | No-slip; OK |

TABLE XX

| Fill Time, Seconds | High Density Polyethylene Remarks |
|---|---|
| 2 | Slipping, bubbles just under surface |
| 5 | Slipping, but surface fairly good because defects were almost healed |
| 10–15 | Some evidence of minor slipping |
| 22 | Probably no-slip; some unhealed defects at end |

TABLE XX-continued

| Fill Time, Seconds | High Density Polyethylene Remarks |
|---|---|
| 26 and higher | No-slip |

The transition between slip and no-slip was obscured because the temperature was too high. With high flow polymers of this type, the transition would be more precise if the melt temperature and/or the mold temperature were lower.

TABLE XXI

| Fill Time, Seconds | Low Density Polyethylene Remarks |
|---|---|
| 7–15 | Slip; many pin holes on surface |
| 19 | Slip; still pin holes on surface |
| 26 | No-slip; bubbles just beneath the surface, however |
| 32–45 | No-slip; but some bubbles just beneath the surface |

EXAMPLE 20

Mold A (using ⅜-inch spacers instead of ½-inch) was employed to make structural foam articles from polysulfone, under the following conditions:

TABLE XXII

| | Run No. | | | |
|---|---|---|---|---|
| | 1 | 2 | 3 | 4 |
| Melt. Temp., ° F. | 600 | — Same → | | |
| Mold Temp., ° F. | 420 | 450 | 510 | 550 |
| Blowing agent | N₂ | — Same → | | |
| Fill Time, sec. | 29 | 27 | 26 | 21 |
| Extr. Pressure, disch., psi | 3700 | — Same → | | |
| Extr. Pressure, barrel, psi | 900 | — Same → | | |
| Blowing agent pressure, psi | 1600 | 1600 | 1800 | 1800 |
| P, psi | 700 | 700 | 900 | 900 |
| Accum. pressure, psi | 3100 | — Same → | | |
| Shot weight, lbs. | 1.35±.05 | — Same → | | |
| Press Pressure, Tons | 15 | — Same → | | |

| Run No. | Comments |
|---|---|
| 1 | Streaks |
| 2 | Better, but still streaks |
| 3 | Few streaks and pock marks |
| 4 | OK |

EXAMPLE 21

Mold A, using ⅜-inch spacers, was used to produce structural foam articles from LEXAN 500 (a bisphenol-A polycarbonate containing 10 weight percent chopped glass fibers), under the following conditions:

TABLE XXIII

| | Run No. | | |
|---|---|---|---|
| | 1 | 2 | 3 |
| Melt. Temp., ° F. | 540 | — Same → | |

TABLE XXIII-continued

| | | | | |
|---|---|---|---|---|
| Mold Temp., °F. | 420 | 480 | | 500 |
| Blowing agent | N₂ | — Same → | | |
| Fill Time, sec. | 15 | 15 | | 14 |
| Extr. Pressure, disch., psi | 3900 | — Same → | | |
| Extr. Pressure, barrel, psi | 2100 | — Same → | | |
| Blowing agent pressure, psi | 2700 | — Same → | | |
| ΔP, psi | 600 | — Same → | | |
| Accum. pressure psi | 3200 | — Same → | | |
| Shot weight, lbs. | 1.2 | — Same → | | |
| Press pressure, Tons | 15 | — Same → | | |

| Run No. | Comments |
|---|---|
| 1 | Streaked bubbles |
| 2 | Better, but still some bubbles |
| 3 | OK |

EXAMPLE 22

A television cabinet top was molded from the high density polyethylene described in Example 18. The polymer contained 20 parts, by weight, per 100 parts of polymer, of chopped ¼-inch glass fibers, and about 1-¼ weight percent titanium dioxide pigment. The part was rectangular in overall shape, 28 inches long by 15 inches wide, ⅜-inch thick, and had curved ends having about a 3-inch radius of curvature. There were two transverse ribs, 20 inches apart, on the bottom side. The mold had two ⅝-inch diameter sprues, both located on the longitudinal axis of the part, one being 1-¼ inch from one rib and the other being 6-¾ inches from the other rib. The molding conditions were as follows:

TABLE XXIV

| | |
|---|---|
| Melt Temp., °F. | 410 |
| Mold Temp., °F. | 360 (top); 70 (bottom) |
| Blowing agent | N₂ |
| Fill Time, sec. | 30 |
| Extr. Pressure, disch., psi | 2400 |
| Extr. Pressure, barrel, psi | 0 |
| Blowing agent pressure, psi | 900 |
| ΔP, psi | 900 |
| Accum. pressure, psi | 2300 |
| Shot weight, lbs. | 4.9 |
| Press pressure, Tons | 40 |

There was perfect replication of the mold on the top of the part. The bottom had streaks and a visible weld line between the two sprues.

EXAMPLE 23

A bathroom sink was molded from Polystyrene C containing 3 weight percent red master batch. The sink measured 19 inches wide by 17 inches deep by about 9 inches high. The part thickness was about ¼ to ⅜-inch. The sink contained holes for drain, overflow, and faucet fixtures. There were four sprues in the mold. The molding conditions were the following:

TABLE XXV

| | |
|---|---|
| Melt Temp., °F. | 440 |
| Mold Temp., °F. | 300 (top); 70 (bottom) |

TABLE XXV-continued

| | |
|---|---|
| Blowing agent | N₂ |
| Fill Time, sec. | 15 |
| Extr. Pressure, disch., psi | 2500 |
| Extr. Pressure, barrel, psi | 500 |
| Blowing agent pressure, psi | 1400 |
| ΔP, psi | 900 |
| Accum. pressure, psi | 2300 |
| Shot weight, lbs. | 7.21 |
| Press pressure, Tons | 40 |

There was perfect mold replication on the top surface of the part. The bottom surface had streaks and visible weld lines between the sprues.

Examples 22 and 23 illustrate that aspect of the invention wherein faithful replication of the mold was obtained on only a predetermined portion of the surface of the structural foam part, rather than on the entire surface. Examples 13–17 also illustrate this aspect.

EXAMPLE 24

Three structural foam bowling pins were produced using the bowling pin mold described in Angell, U.S. Pat. No. 3,268,636, from a high density polyethylene having a density of 0.96 and a melt index of 0.2. (The polymer was not the one described in the Examples of the Angell patent, since that polymer is no longer available commercially.) The polymer contained 1 weight percent titanium dioxide pigment and 0.5 weight percent azodicarbonamide blowing agent. The conditions used were the following:

TABLE XXVI

| | Run Number | | |
|---|---|---|---|
| | 1 | 2 | 3 |
| Melt Temp., °F. | 390 | 390 | 390 |
| Mold Temp., °F. | 268 | 270 | 500 |
| Fill Time, seconds | 10 | 43 | 54 |
| Extr. Pressure, disch., psi | 4000 | 4000 | 4000 |
| Accum. Pressure, psi | 3100 | 3100 | 3100 |
| Shot Weight | 3.35 | 3.26 | 3.43 |
| Press Pressure, Tons | 15 | 15 | 15 |

| Run No. | Comments |
|---|---|
| 1 | Fairly glossy over about 50 per cent of surface, but contained pock marks, fracture marks, and weld marks. |
| 2 | A little better than 1, but still contained pock marks, fracture marks, and some weld marks. |
| 3 | Much better, but still contained pock marks; no weld marks. However, faithful replication achieved only in the neck of the bowling pin and around the bottom of the pin (which was the top of the mold), where there was flow. |

EXAMPLE 25

In this series of experiments, Mold A was employed to mold structural foam articles from several different thermoplastic polymers. The conditions employed, the polymers used, and comments are displayed in Tablex XXVII through XXX, below:

TABLE XXVII

| | Polystyrene A | | | | |
|---|---|---|---|---|---|
| | | | Run No | | |
| | 1 | 2 | 3 | 4 | 5 |
| Melt Temp., °F. | 390 | 400 | 420 | 435 | 450 |
| Mold Temp., °F. | 390 | 400 | 420 | 435 | 450 |
| Blowing agent | N₂ | N₂ | N₂ | N₂ | N₂ |
| Fill Time, sec. | 24 | 47 | 26 | 36 | 36 |

TABLE XXVII-continued

|  | Polystyrene A | | | | |
|---|---|---|---|---|---|
| Extr. Pressure, disch., psi | 4000 | 4000 | 3700 | 3600 | 3500 |
| Extr. Pressure, barrel, psi | 1500 | 1500 | 1600 | 1600 | 1600 |
| Blowing agent pressure, psi | 1950 | 1950 | 1950 | 2000 | 2000 |
| $\Delta P$, psi | 450 | 450 | 350 | 400 | 400 |
| Accum. pressure, psi | 3100 | 3100 | 3100 | 3100 | 3100 |
| Shot weight, lbs. | 1.52 | 1.59 | 1.40 | 1.42 | 1.43 |
| Press pressure, Tons | 15 | 15 | 15 | 15 | 15 |

| Run No. | Comments |
|---|---|
| 1 | Small bubbles visible very near surface |
| 2 | Pock marks over entire part; small bubbles visible very near surface |
| 3 | Some pock marks; small bubbles visible very near surface |
| 4–5 | Excellent part, save for some pock marks near the edge and a few bubbles visible near the surface |

TABLE XXVIII

|  | ABS | | |
|---|---|---|---|
|  | Run No. | | |
|  | 1 | 2 | 3 |
| Melt Temp., °F. | 415 | 430 | 440 |
| Mold Temp., °F. | 415 | 430 | 440 |
| Blowing agent | $N_2$ | $N_2$ | $N_2$ |
| Fill Time, sec. | 34 | 33 | 28 |
| Extr. Pressure, disch., psi | 3700 | 3600 | 3500 |
| Extr. Pressure, barrel, psi | 1900 | 1900 | 1900 |
| Blowing agent pressure, psi | 2400 | 2400 | 2400 |
| $\Delta P$, psi | 500 | 500 | 500 |
| Accum. pressure, psi | 3100 | 3100 | 3100 |
| Shot weight, lbs. | 1.47 | 1.46 | 1.39 |
| Press pressure, Tons | 15 | 15 | 15 |

| Run No. | Comments |
|---|---|
| 1 | Small bubbles visible very near surface; some pock marks; evidence of some slipping on the surface |
| 2 | Some bubble defects near edges, otherwise excellent |
| 3 | Same as 2 |

TABLE XXIX

|  | High Density Polyethylene | | |
|---|---|---|---|
|  | Run No. | | |
|  | 1 | 2 | 3 |
| Melt Temp., °F. | 320 | 335 | 350 |
| Mold Temp., °F. | 320 | 335 | 350 |
| Blowing agent | $N_2$ | $N_2$ | $N_2$ |
| Fill Time, sec. | 54 | 46 | 48 |
| Extr. Pressure, disch., psi | 3500 | 3500 | 3500 |
| Extr. Pressure, barrel, psi | 900 | 950 | 1000 |
| Blowing agent pressure, psi | 1400 | 1400 | 1400 |
| $\Delta P$, psi | 500 | 450 | 400 |
| Accum. pressure, psi | 3100 | 3100 | 3100 |
| Shot weight, lbs. | 1.1 | 1.1 | 1.19 |
| Press pressure, Tons | 15 | 15 | 15 |

| Run No. | Comments |
|---|---|
| 1 | Small bubbles visible very close to surface. |
| 2 | Same imperfections, but to a lesser extent and closer to far end of the part (i.e., away from the sprue) |
| 3 | Excellent, except for very small area at far end of part |

TABLE XXX

| Polystyrene A plus 20 parts, by weight, per hundred parts of polymer, of ¼-inch chopped glass fibers | | | | | |
|---|---|---|---|---|---|
|  | Run No. | | | | |
|  | 1 | 2 | 3 | 4 | 5 |
| Melt Temp., °F. | 450 | 470 | 485 | 500 | 525 |
| Mold Temp., °F. | 450 | 470 | 485 | 500 | 525 |
| Blowing agent | $N_2$ | $N_2$ | $N_2$ | $N_2$ | $N_2$ |
| Fill Time, sec. | 26 | 33 | 42 | 42 | 33 |
| Extr. Pressure, disch., psi | 3700 | 3700 | 3700 | 3700 | 3700 |
| Extr. Pressure, barrel, psi | 1550 | 1550 | 1550 | 1550 | 1550 |
| Blowing agent | 1950 | 1950 | 1950 | 1950 | 1950 |
| $\Delta P$, psi | 400 | 400 | 400 | 400 | 400 |
| Accum. pressure psi | 3100 | 3100 | 3100 | 3100 | 3100 |
| Shot weight, lbs. | 1.47 | 1.52 | 1.58 | 1.57 | 1.62 |
| Press pressure, Tons | 15 | 15 | 15 | 15 | 15 |

| Run No. | Comments |
|---|---|
| 1 | Bubbles visible close to surface; small pin holes far half of part |
| 2 | Same comments as 1 |
| 3 | Same comments, but better than 2 |
| 4 | Same comments, but better than 3 |
| 5 | OK, except a few pin holes at far 1½ inches of part. |

The experiments described in Example 25 were performed in order to determine if the rheological property, viscosity, could be shown to be correlated with the healing of the leading edge problem. It was known that as the mold temperature was increased (other parameters being held constant), one could, for fill rates in which no slip was occurring, eventually heal the leading edge defects. It was felt that if one measured the viscosity of the melt at the temperature of the mold/melt interface (at that temperature that was just sufficient to eliminate the leading edge problem), and if this viscosity was similar for a widely diverse set of polymers, then this would be strong confirming evidence for the theory that the healing of the leading edge problem was directly correlated to that rheological property, viscosity.

The experiments described in Example 18 allow one to determine a replication temperature for the given set of melt, process, and mold conditions. Because the melt and mold temperatures were dissimilar in all cases shown in that Example, the temperatures at the mold/melt interfaces were not known. Therefore, the interface viscosities could not be determined, because viscosity is dependent upon temperature.

Figure 33:
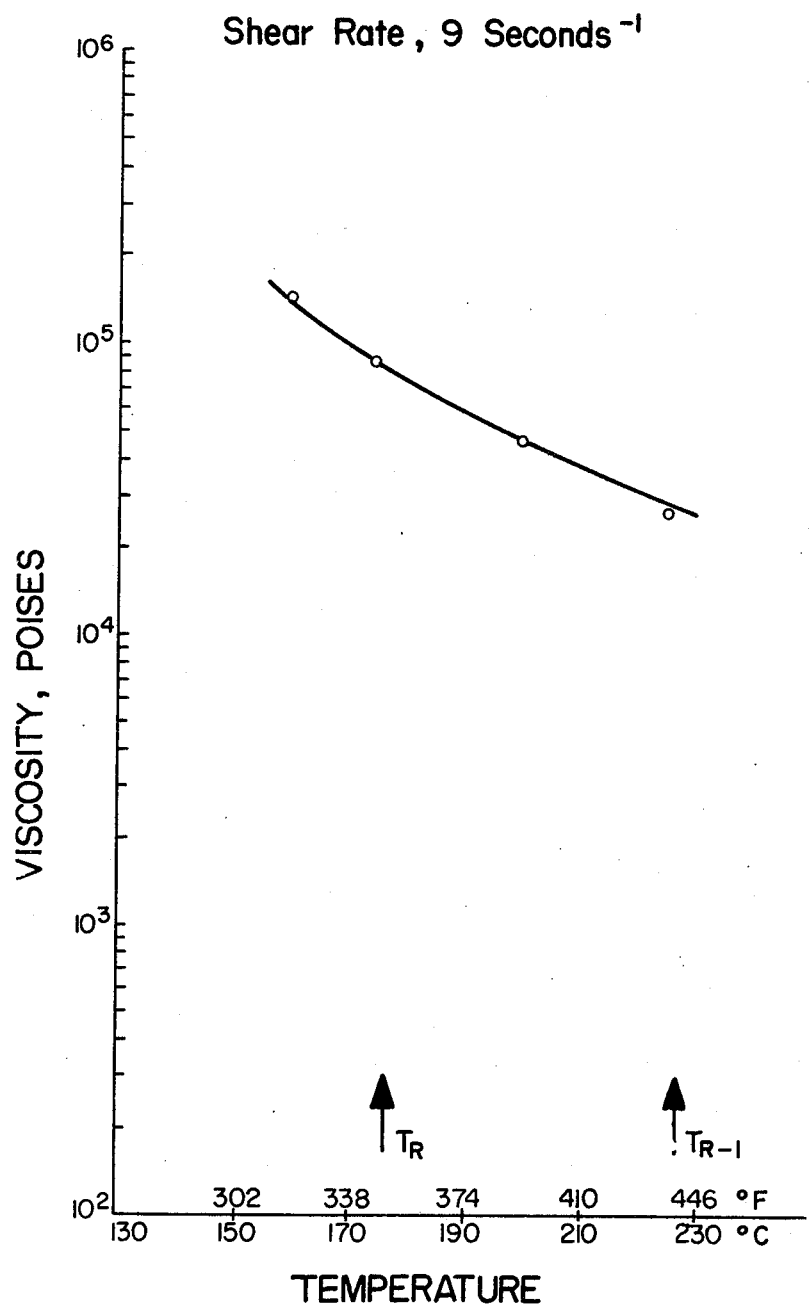
FIGS. 33 through 35 are graphs of viscosity versus temperature for three thermoplastic polymers.
Figure 34:
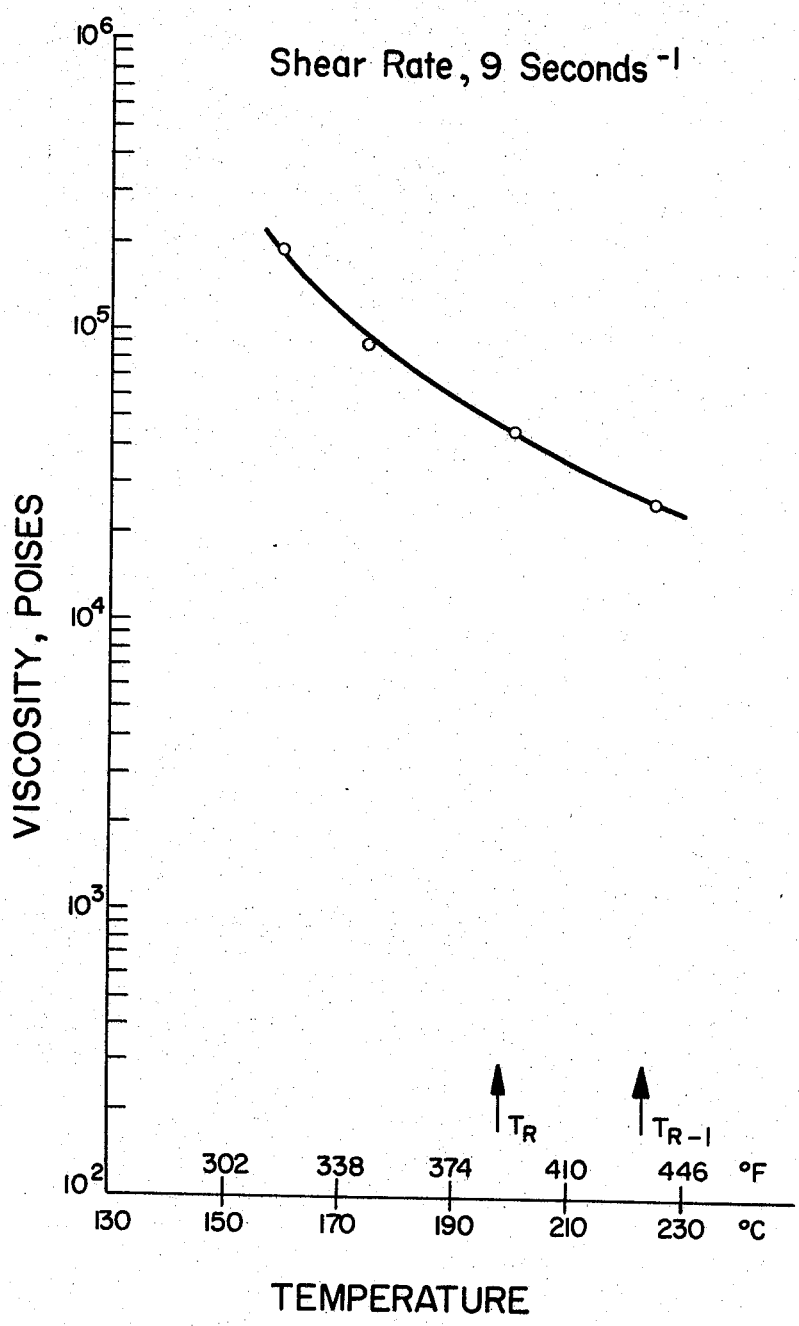
Figure 35:
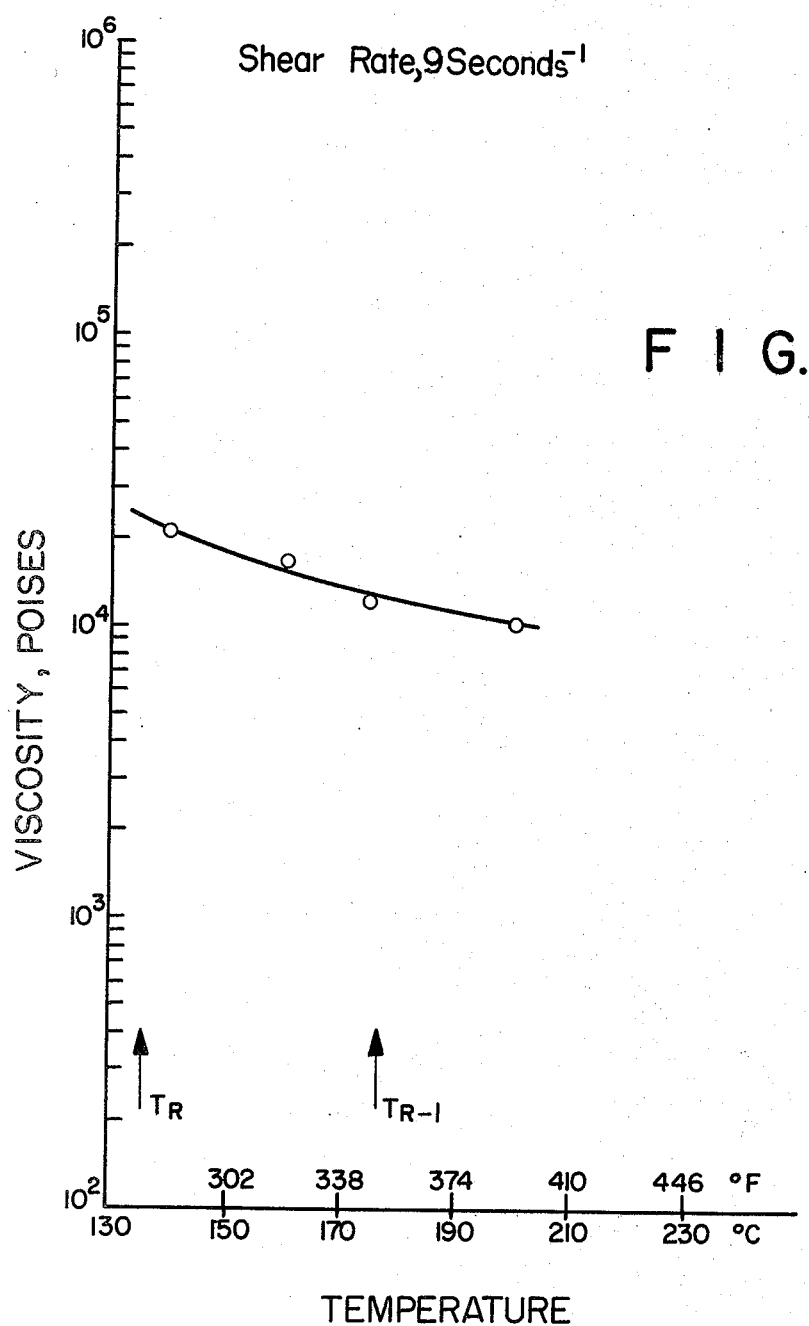

The experiments described in Example 25 eliminate the above-mentioned difficulty. In these cases, the mold temperature and melt temperature were always identical. The minimum melt and mold temperatures which produced a part free of surface imperfections was determined. This temperature is referred to herein as the isothermal replication temperature, $T_{R-I}$. From the graphs of viscosity versus temperature, at a shear rate of 9 seconds$^{-1}$, shown in FIGS. 33-35, the viscosity of the thermoplastic material at $T_{R-I}$ was determined. These viscosities are displayed below in Table XXXI:

TABLE XXXI

| Polymer | $T_{R-I}$, °F. | Viscosity (at 9 sec.$^{-1}$), poises |
|---|---|---|
| Polystyrene A | 435–440 | $2.7 \times 10^4$ |
| ABS | 430 | $2.8 \times 10^4$ |

TABLE XXXI-continued

| Polymer | $T_{R-I}$, °F. | Viscosity (at 9 sec.$^{-1}$), poises |
|---|---|---|
| HDPE | 350 | $1.3 \times 10^4$ |

Polystyrene A containing 20 parts per hundred of chopped glass fibers had a $T_{R-I}$ of about 525° F. At this temperature, the thermoplastic material has a viscosity of $1.3 \times 10^4$ poises, at 9 sec$^{-1}$.

While the replication temperature was not determined isothermally for polysulfone, the data presented above in Example 20 indicate that $T_{R-I}$ for polysulfone would be between 550° and 600° F. The viscosity of polysulfone at a shear rate of 9 sec$^{-1}$ at 550° and 600° F. is approximately $2.8 \times 10^4$ and $1.03 \times 10^4$ poises, respectively.

It is seen that the viscosities of these materials at their respective isothermal replication temperatures are within a factor of about 2, which is very close for this type of determination.

A problem with these determinations (and one probable reason why the viscosities are only within a factor of about 2) is that the viscosities of the thermoplastic materials were determined at 9 sec$^{-1}$. (Viscosity is a function of shear rate, as may be seen from FIGS. 15-20.) For there to have been exact correlation in this experiment, the healing of the leading edge problem would have had to occur at 9 seconds$^{-1}$. It is not known exactly what the shear rate is during the healing process, nor have we been able to determine it. It is felt that the healing is a low shear rate process, possibly lower than 9 seconds$^{-1}$. (With the analytical equipment presently available to us, a shear rate of 9 seconds$^{-1}$ was the lowest that could be used to measure viscosity.)

It is important to note that, for the same thermoplastic materials, $T_{R-I}$ is higher than $T_R$ as determined in Example 18. The experiments reported in Example 18 utilized higher melt temperatures, of the order that would normally be used for processing. In carring out the isothermal experiments, it is seen that the mold temperature was increased above $T_R$, and the melt temperature was decreased from that used in Example 18. This illustrates the fact that the determination of $T_R$ is sensitive to the particular values chosen for the other parameters. Although it is felt that the interface temperature will be closer to the mold than to the melt temperature (unless the procedure of Examples 13-17 is employed), the latter will still tend to distort the temperature, usually raising it.

Another important factor in the isothermal experiment is that there is no heat flow from melt to mold, since both are at the same temperature (except near the insufficiently heated edges, where there is some heat loss to the spacer frame). This is important because each of the polymers have different thermal conductivities, and in the type of experiment reported in Example 18, would be expected to transfer heat into the mold at different rates. This difference in rate of heat transfer will affect the interfacial temperature. Therefore, one would not expect the experiments in Example 18 to yield a good correlation with rheological properties.

It should be emphasized that not even the value of $T_{R-I}$ is absolute. In addition to the dependence on mold construction and geometry, nozzle design, fill rate, nitrogen pressure, and the like, it also depends on the pressure exerted by the melt on the mold cavity walls. While the densities of the parts made in this Example are approximately equivalent, not even this insures that the pressures exerted on the mold walls will be identical. As the internal mold pressure increases, the material will tend to flow out against the mold and tend to heal the leading edge imperfections. The true, absolute method for determining $T_{R-I}$ for different polymers under equivalent conditions, should also insure that the mold pressures be identical, in time and location along the part. It is felt that part of the factor of 2 difference in the viscosities is caused by unequal mold pressures.

All the viscosity values that are reported in this application were determined without using the Rabinowitsch correction for the shear rate, and without making the end corrections for the shear stress. Thus, the viscosity values shown on the graphs are actually what is normally termed in the art "apparent" viscosities.

The discussions of theory that are contained in this specification are our best explanations of the experimental evidence. However, we do not wish to be bound by these theories in the event that all or any part of the theories should later be proven false.

EXAMPLE 26

By the procedure described in Example 25, $T_{R-I}$ for an ethylene/propylene copolymer (melt index = 4, density = 0.95), was determined to be 380° F. At this temperature, and at a shear rate of 9 seconds$^{-1}$, the viscosity of this copolymer is $1.6 \times 10^4$ poises.

What is claimed is:

1. In a process for injection molding foamed thermoplastic articles characterized by a foamed core, a relatively non-foamed exterior shell, and a surface that reproducibly and faithfully replicates a predetermined portion of the inner surface of the mold in which the article was made, wherein a mixture comprising molten foamable thermoplastic material and blowing agent is introduced under pressure into a mold cavity defined by the inner surface of the mold, the mold cavity being maintained at a pressure below the foaming pressure of said mixture, whereby said mixture flows and expands in said mold cavity, and said thermoplastic material is rigidified while it is in said mold cavity, the improvement comprising the steps of:
  a. maintaining said mixture in adhesive contact with said predetermined portion of said inner surface of the mold, thereby defining a polymer/mold interface as said mixture flows within said mold cavity;
  b. maintaining a no-slip boundary condition between said mixture and said inner surface of the mold at said interface, as said mixture flows within said mold cavity; and
  c. maintaining the temperature at said interface at a temperature of at least the replication temperature of said thermoplastic material, as said mixture flows within said mold cavity.

2. Process of claim 1 wherein said no-slip boundary condition is maintained by introducing said mixture into said mold cavity at a rate such that, as said mixture flows within said mold, the forces resulting from the shearing stresses in said mixture at said interface are (a) less than the maximum value of the static frictional force between said mixture and said predetermined portion of said inner surface of the mold, and (b) less than the melt strength of said molten thermoplastic material.

3. Process of claim 1 wherein the temperature at said interface is maintained at or above said replication temperature by maintaining the temperature of at least the portion of said mold that includes said predetermined portion of said inner surface at or above said replication temperature.

4. Process of claim 2 wherein the temperature at said interface is maintained at or above said replication temperature by maintaining the temperature of at least the portion of said mold that includes said predetermined portion of said inner surface at or above said replication temperature.

5. Process of claim 1 wherein said mold includes a body portion having a relatively high heat capacity, wherein said predetermined portion of the inner surface of said mold comprises a member having a relatively low heat capacity, wherein said body portion and said member are separated by a heat insulating layer, wherein said body portion is maintained at a temperature below said replication temperature, and wherein said mixture is at a temperature above said replication temperature when it is introduced into said mold cavity, whereby said interface is maintained at or above said replication temperature while said mixture flows in said mold cavity.

6. Process of claim 1 wherein said thermoplastic material consists essentially of at least one member of the group consisting of olefin polymer, styrene polymer, polycarbonate, polyamide, polyaryl polyhydroxy ether, polysulfone, polyester, acrylic polymer, acetal polymer and mixtures thereof.

7. Process of claim 6 wherein said thermoplastic material consists essentially of at least one member of the group consisting of polystyrene, high density polyethylene, low density polyethylene, polypropylene, acrylonitrile-butadiene-styrene terpolymer, polysulfone, polycarbonate, and mixtures thereof.

8. Process of claim 1 wherein said blowing agent is selected from the group consisting of nitrogen, carbon dioxide, pentane, a $C_1$ to $C_4$ halogenated hydrocarbon, an azo compound, an N-nitroso compound, a sulfonyl hydrazide compound, a sulfonyl semicarbazide compound, and mixtures thereof.

9. The process of claim 8 wherein said blowing agent is selected from the group consisting of nitrogen, dichlorodifluoromethane, azodicarbonamide, and mixtures thereof.

10. In a process for injection molding foamed thermoplastic articles characterized by a foamed core, a relatively non-foamed exterior shell, and a surface that reproducibly and faithfully replicates a predetermined portion of the inner surface of the mold in which the article was made, wherein a mixture comprising molten foamable thermoplastic material and blowing agent is introduced under pressure into a mold cavity defined by the inner surface of the mold, the volume of said mixture introduced into said cavity being less than the volume of said cavity, the mold cavity being maintained at a pressure below the foaming pressure of said mixture, whereby said mixture flows and expands in said mold cavity, and said thermoplastic material is rigidified while it is in said mold cavity, the improvement comprising the steps of:

a. maintaining said mixture in adhesive contact with said predetermined portion of said inner surface of the mold, thereby defining a polymer/mold interface as said mixture flows within said mold cavity;

b. maintaining a no-slip boundary condition between said mixture and said inner surface of the mold at said interface, as said mixture flows within said mold cavity; and c. maintaining the temperature at said interface at a temperature of at least the replication temperature of said thermoplastic material, as said mixture flows within said mold cavity.

11. Process of claim 10 wherein said no-slip boundary condition is maintained by introducing said mixture into said mold cavity at a rate such that, as said mixture flows within said mold, the forces resulting from the shearing stresses in said mixture at said interface are (a) less than the maximum value of the static frictional force between said mixture and said predetermined portion of said inner surface of the mold, and (b) less than the melt strength of said molten thermoplastic material.

12. Process of claim 10 wherein the temperature at said interface is maintained at or above said replication temperature by maintaining the temperature of at least the portion of said mold that includes said predetermined portion of said inner surface at or above said replication temperature.

13. Process of claim 11 wherein the temperature at said interface is maintained at or above said replication temperature by maintaining the temperature of at least the portion of said mold that includes said predetermined portion of said inner surface at or above said replication temperature.

14. Process of claim 10 wherein said mold includes a body portion having a relatively high heat capacity, wherein said predetermined portion of the inner surface of said mold comprises a member having a relatively low heat capacity, wherein said body portion and said member are separated by a heat insulating layer, wherein said body portion is maintained at a temperature below said replication temperatures, and wherein said mixture is at a temperature above said replication temperature when it is introduced into said mold cavity, whereby said interface is maintained at or above said replication temperature while said mixture flows in said mold cavity.

15. Process of claim 10 wherein said thermoplastic material consists essentially of at least one member of the group consisting of olefin polymer, styrene polymer, polycarbonate, polyamide, polyaryl polyhydroxy ether, polysulfone, polyester, acrylic polymer, acetal polymer, and mixtures thereof.

16. Process of claim 15 wherein said thermoplastic material consists essentially of at least one member of the group consisting of polystyrene, high density polyethylene, low density polyethylene, polypropylene, acrylonitrile-butadiene-styrene terpolymer, polysulfone, polycarbonate, and mixtures thereof.

17. Process of claim 10 wherein said blowing agent is selected from the group consisting of nitrogen, carbon dioxide, pentane, a $C_1$ to $C_4$ halogenated hydrocarbon, an azo compound, an N-nitroso compound, a sulfonyl hydrazide compound, a sulfonyl semicarbazide compound, and mixtures thereof.

18. The process of claim 17 wherein said blowing agent is selected from the group consisting of nitrogen, dichlorodifluoromethane, azodicarbonamide, and mixtures thereof.

* * * * *